US012647976B2

(12) United States Patent
Choi et al.

(10) Patent No.: US 12,647,976 B2
(45) Date of Patent: *Jun. 2, 2026

(54) CHANNEL MULTIPLEXING METHOD AND MULTIPLEXED CHANNEL TRANSMISSION METHOD FOR WIRELESS COMMUNICATION SYSTEM AND DEVICE USING SAME

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 131 days.

This patent is subject to a terminal disclaimer.

(21) Appl. No.: 18/614,631

(22) Filed: Mar. 22, 2024

(65) Prior Publication Data

US 2024/0267915 A1     Aug. 8, 2024

Related U.S. Application Data

(63) Continuation of application No. 17/884,568, filed on Aug. 10, 2022, now Pat. No. 11,956,774, which is a
(Continued)

(30) Foreign Application Priority Data

Jan. 13, 2018    (KR) ........................ 10-2018-0004734
Jan. 9, 2019    (KR) ........................ 10-2019-0002588

(51) Int. Cl.
*H04W 72/1268*    (2023.01)
*H04L 5/00*    (2006.01)
*H04W 88/02*    (2009.01)

(52) U.S. Cl.
CPC ....... *H04W 72/1268* (2013.01); *H04L 5/0055* (2013.01); *H04W 88/02* (2013.01)

(58) Field of Classification Search
CPC .. H04W 72/1268; H04W 88/02; H04L 5/0055
See application file for complete search history.

(56) References Cited

U.S. PATENT DOCUMENTS 10,827,541 B2    11/2020  Park et al.
10,951,383 B2    3/2021  Lu et al.
(Continued)

FOREIGN PATENT DOCUMENTS

CN    103220070    7/2013
CN    103548409    1/2014
(Continued)

OTHER PUBLICATIONS

Office Action (1st) dated Feb. 6, 2025 for European Patent Application No. 20 874 863.2.
(Continued)

*Primary Examiner* — Michael J Moore, Jr.
(74) *Attorney, Agent, or Firm* — WOMBLE BOND DICKINSON (US) LLP

(57)    ABSTRACT

A base station of a wireless communication system is disclosed. The base station of the wireless communication includes: a communication module; and a processor configured to control the communication module. When a second physical uplink data channel transmission of the UE is scheduled to a time-frequency resource in which uplink control information (UCI) transmission of a first physical uplink data channel of the UE is scheduled, the processor is
(Continued)

(a)

(b)

configured to transmit the UCI to a base station of the wireless communication system in a time-frequency resource except for a time-frequency resource in which a second physical uplink data channel transmission of the UE is scheduled.

24 Claims, 17 Drawing Sheets

Related U.S. Application Data continuation of application No. 16/924,060, filed on Jul. 8, 2020, now Pat. No. 11,523,414, which is a continuation of application No. PCT/KR2019/000562, filed on Jan. 14, 2019.

(56) References Cited

U.S. PATENT DOCUMENTS

| | | | | |
|---|---|---|---|---|
| 10,979,976 | B1 | 4/2021 | Babaei | |
| 10,986,695 | B1 | 4/2021 | Babaei | |
| 11,523,414 | B2 * | 12/2022 | Choi | H04L 5/0007 |
| 11,601,966 | B2 | 3/2023 | Choi et al. | |
| 11,956,774 | B2 * | 4/2024 | Choi | H04L 5/0007 |
| 2013/0195048 | A1 | 8/2013 | Ekpenyong et al. | |
| 2014/0369324 | A1 | 12/2014 | Lin et al. | |
| 2016/0233986 | A1 | 8/2016 | Lee et al. | |
| 2016/0262182 | A1 | 9/2016 | Yang et al. | |
| 2018/0192434 | A1 * | 7/2018 | Lee | H04W 28/12 |
| 2018/0367263 | A1 * | 12/2018 | Ying | H04L 1/1854 |
| 2018/0368110 | A1 * | 12/2018 | Ying | H04L 1/0075 |
| 2019/0044681 | A1 | 2/2019 | Zhang | |
| 2019/0082431 | A1 * | 3/2019 | Yi | H04L 5/0055 |
| 2019/0246395 | A1 | 8/2019 | Huang et al. | |
| 2020/0008216 | A1 * | 1/2020 | Iyer | H04W 72/23 |
| 2020/0077470 | A1 * | 3/2020 | Xiong | H04L 1/0013 |
| 2020/0119895 | A1 * | 4/2020 | Choi | H04W 24/08 |
| 2020/0305183 | A1 | 9/2020 | Papasakellariou | |
| 2020/0344780 | A1 | 10/2020 | Choi et al. | |
| 2020/0351897 | A1 | 11/2020 | Fakoorian et al. | |
| 2020/0389876 | A1 | 12/2020 | Islam et al. | |
| 2021/0022134 | A1 | 1/2021 | Chen et al. | |
| 2021/0051706 | A1 | 2/2021 | Yang et al. | |
| 2021/0100012 | A1 | 4/2021 | Miao | |
| 2021/0168848 | A1 | 6/2021 | Chatterjee et al. | |
| 2022/0039100 | A1 | 2/2022 | Yoshioka et al. | |
| 2022/0361204 | A1 | 11/2022 | Zhao et al. | |
| 2022/0361231 | A1 | 11/2022 | Oh et al. | |
| 2022/0394740 | A1 | 12/2022 | Choi et al. | |
| 2023/0146753 | A1 | 5/2023 | Choi et al. | |

FOREIGN PATENT DOCUMENTS

| | | |
|---|---|---|
| CN | 105264995 | 1/2016 |
| CN | 107409021 | 11/2017 |
| CN | 109997399 | 7/2019 |
| EP | 3 860 033 | 8/2021 |
| JP | 2016-530749 | 9/2016 |
| KR | 10-2018-0108342 | 10/2018 |
| KR | 10-2019-0086618 | 7/2019 |
| WO | 2013/048070 | 4/2013 |
| WO | 2014/088294 | 6/2014 |
| WO | 2017/171516 | 10/2017 |
| WO | 2019/098059 | 5/2019 |
| WO | 2019/139446 | 7/2019 |
| WO | 2019/158077 | 8/2019 |
| WO | 2019/160332 | 8/2019 |
| WO | 2019/184688 | 10/2019 |
| WO | 2019/184691 | 10/2019 |
| WO | 2019/190374 | 10/2019 |
| WO | 2019/191977 | 10/2019 |
| WO | 2020/033660 | 2/2020 |
| WO | 2020/201388 | 10/2020 |
| WO | 2020/223448 | 11/2020 |
| WO | 2021/014576 | 1/2021 |
| WO | 2021/066596 | 4/2021 |
| WO | 2021/071260 | 4/2021 |
| WO | 2021/088969 | 5/2021 |
| WO | 2021/093124 | 5/2021 |
| WO | 2021/093125 | 5/2021 |
| WO | 2021/097590 | 5/2021 |
| WO | 2021/109463 | 6/2021 |

OTHER PUBLICATIONS

Extended European Search Report dated Feb. 7, 2025 for European Patent Application No. 24221020.1.

Office Action dated Mar. 21, 2025 for Korean Patent Application No. 10-2022-7045565 and its English translation provided by Applicant's foreign counsel.

Intel Corporation: "Multiplexing of different data channel durations", 3GPP TSG RAN WG1 Meeting 90bis, R1-1717398, Prague, Czech Republic, Oct. 3, 2017, pp. 1-10.

Office Action dated Mar. 21, 2025 for Korean Patent Application No. 10-2022-7045566 and its English translation provided by Applicant's foreign counsel.

Motorola Mobility et al.: "Multiplexing of uplink channels with different transmission durations." R1-1720927. 3GPP TSG RAN WG1#91. Reno, USA. Nov. 18, 2017. See pp. 1-3; and figure 1.

Huawei et al.: "On UCI multiplexing." R1-1719397. 3GPP TSG RAN WG1 Meeing #91. Reno, USA. Nov. 18, 2017. See pp. 4-6; and figures 2-3.

International Search Report for PCT/KR2019/000562 mailed on May 13, 2019 and its English translation from WIPO (now published as WO 2019/139446).

Written Opinion of the International Searching Authority for PCT/KR2019/000562 mailed on May 13, 2019 and its English translation by Google Translate (now published as WO 2019/139446).

International Preliminary Report on Patentability (Chapter I) for PCT/KR2019/000562 issued on Jul. 14, 2020 and its English translation from WIPO.

International Search Report for PCT/KR2020/013692 mailed on Jan. 20, 2021 and its English translation from WIPO.

Written Opinion of the International Searching Authority for PCT/KR2020/013692 mailed on Jan. 20, 2021 and its English translation by Google Translate.

Nokia, Nokia Shanghai Bell: "Proposed corrections for the slot configuration in 38.213", 3GPP TSG RAN WG1 Meeting #93, R1-1806656, Busan, Republic of Korea, May 21-25, 2018, pp. 1-12.

Wilus Inc.: "On UL cancellation scheme for NR URLLC", 3GPP TSG RAN WG1 #98, R1-1909369, Prague, CZ, Aug. 26-30, 2019, pp. 1-5.

LG Electronics: "Remaining issues on pre-emption indication", 3GPP TSG RAN WG1 Meeting AH 1801, R1-1800383, Vancouver, Canada, Jan. 22-26, 2018, pp. 1-6.

Office Action dated Sep. 10, 2021 for Indian Patent Application No. 202027027830.

Extended European Search Report dated Aug. 18, 2021 for European Patent Application No. 19738296.3.

Sharp: "Simultaneous PUCCH and PUSCH transmission and collision handling", 3GPP TSG RAN WG1 NR#90bis Meeting, R1-1718418, Prague, Czech Republic, Oct. 9-13, 2017, pp. 1-2.

Notice of Allowance dated May 23, 2022 for U.S. Appl. No. 16/924,060 (now published as US 2020/0344780).

Office Action dated Dec. 21, 2021 for U.S. Appl. No. 16/924,060 (now published as US 2020/0344780).

Office Action dated Aug. 12, 2022 for Korean Patent Application No. 10-2020-7021102 and its English translation provided by the Applicant's foreign counsel.

Vivo: "Remaining issued on multiplexing data with different transmission durations", 3GPP TSG RAN WG1 Meeting 91, R1-1719798, Reno, USA, Nov. 27-Dec. 1, 2017, pp. 1-11.

Vivo: "Summary of multiplexing data with different transmission durations", 3GPP TSG RAN WG1 Meeting 91, R1-1721491, Reno, USA, Nov. 27-Dec. 1, 2017, pp. 1-8.

Extended European Search Report dated Aug. 16, 2022 for European Patent Application No. 22177959.8.

(56) References Cited

OTHER PUBLICATIONS

Fujitsu: "On eMMB and URLL Multiplexing", 3GPP TSG RAN WG1 Meeting #91, R1-1719616, Reno, USA, Nov. 27-Dec. 1, 2017, pp. 1-7.

Notice of Allowance dated Aug. 23, 2022 for U.S. Appl. No. 17/715,037.

Office Action dated Aug. 22, 2022 for Japanese Patent Application No. 2020-538543 and its English translation provided by the Applicant's foreign counsel.

Office Action dated Sep. 7, 2022 for Indian Patent Application No. 202227024342.

Corrected Notice of Allowance dated Sep. 23, 2022 for U.S. Appl. No. 16/924,060.

Extended European Search Report dated Oct. 5, 2022 for European Patent Application No. 22191562.2.

Extended European Search Report dated Oct. 5, 2022 for European Patent Application No. 22191571.3.

Extended European Search Report dated Nov. 7, 2022 for European Patent Application No. 20874863.2.

Notice of Allowance dated Dec. 1, 2022 for Korean Patent Application No. 10-2020-7021102 and its English translation provided by the Applicant's foreign counsel.

CATT: "Remaining aspects of pre-emption indication", 3GPP TSG RAN WG1 Meeting #91, R1-1720207, Reno, USA, Nov. 27-Dec. 1, 2017, pp. 1-7.

Office Action dated Jan. 30, 2023 for Japanese Patent Application No. 2020-538543 and its English translation provided by the Applicant's foreign counsel.

Office Action dated Feb. 27, 2023 for Japanese Patent Application No. 2022-521338 and its English translation provided by the Applicant's foreign counsel.

Office Action dated Aug. 1, 2023 for U.S. Appl. No. 17/884,564.

Notice of Allowance dated Sep. 19, 2023 for Japanese Patent Application No. 2022-521338 and its English translation provided by the Applicant's foreign counsel.

Office Action dated Sep. 13, 2023 for Chinese Patent Application No. 201980007966.9 and its English translation provided by the Applicant's foreign counsel.

Notice of Allowance dated Sep. 5, 2023 for European Patent Application No. 20 874 863.2.

Notice of Allowance dated Dec. 4, 2023 for U.S. Appl. No. 17/884,564.

Extended European Search Report dated Dec. 4, 2023 for European Patent Application No. 23201667.5.

Office Action dated Jan. 25, 2024 for U.S. Appl. No. 18/091,362.

Notice of Allowance dated Dec. 11, 2023 for U.S. Appl. No. 17/884,568 (now published as US 2022/0394740).

Office Action dated Aug. 2, 2023 for U.S. Appl. No. 17/884,568 (now published as US 2022/0394740).

Office Action dated May 7, 2024 for Japanese Patent Application No. 2023-089016 and its English translation provided by Applicant's foreign counsel.

Office Action dated May 7, 2024 for Japanese Patent Application No. 2023-089015 and its English translation provided by Applicant's foreign counsel.

Extended European Search Report dated May 2, 2024 for European Patent Application No. 24151663.2.

Fujitsu: "Discussion on UL cancellation indication", 3GPP TSG RAN WG1 #98, R1-1908321, Prague, CZ, Aug. 16, 2019, pp. 1-4.

Mediatek Inc: "Summary of Bandwidth Part Remaining Issues", 3GPP TSG RAN WG1 Meeting #92bis, R1-1805543, Sanya, China, Apr. 18, 2018, pp. 1-15.

Notice of Allowance dated May 7, 2024 for Taiwanese Patent Application No. 109134845 and its English translation provided by Applicant's foreign counsel.

Office Action dated May 17, 2024 for U.S. Appl. No. 18/092,209.

Notice of Allowance dated May 21, 2024 for U.S. Appl. No. 18/091,362.

Notice of Allowance dated May 29, 2024 for Vietnamese Patent Application No. 1-2020-04655 and its English translation provided by Applicant's foreign counsel.

Office Action dated Aug. 30, 2024 for Vietnamese Patent Application No. 1-2022-02878 and its English translation provided by Applicant's foreign counsel.

Office Action dated May 19, 2025 for Taiwanese Patent Application No. 109134845 and its English translation provided by Applicant's foreign counsel.

Notice of Allowance dated Jun. 25, 2025 for Korean Patent Application No. 10-2022-7011513 and its English translation provided by Applicant's foreign counsel.

Mitsubishi Electric: "Views on UL cancellation", 3GPP TSG RAN WG1 Meeting #97, R1-1907176, Reno, USA, May 13-17, 2019, pp. 1-3.

Panasonic: "On NR URLLC scheduling and UL cancellation processing timeline", 3GPP TSG RAN WG1 Ad-Hoc Meeting 1901, R1-1900675, Taipei, Taiwan, Jan. 21-25, 2019, pp. 1-2.

Sharp: "UL cancelation indication design for enhanced inter UE Tx prioritization/multiplexing", 3GPP TSG RAN WG1 Meeting #98, R1-1909103, Prague, CZ, Aug. 26-30, 2019, pp. 1-3.

Sharp: "UL cancelation scheme for enhanced inter UE Tx prioritization/multiplexing", 3GPP TSG RAN WG1 Meeting #97, R1-1907223, Reno, USA, May 13-17, 2019, pp. 1-4.

Office Action dated Nov. 18, 2024 for Japanese Patent Application No. 2023-180599 and its English translation provided by Applicant's foreign counsel.

Vivo: "Summary#2 of UL inter UE Tx prioritization/multiplexing", 3GPP TSG RAN WG1 #98, R1-1909774, Prague, CZ, Aug. 30, 2019, pp. 1-40.

Office Action dated Dec. 31, 2024 for Chinese Patent Application No. 202080078859.8 and its English translation provided by Applicant's foreign counsel.

Office Action dated Jan. 7, 2025 for Korean Patent Application No. 10-2022-7011513 and its English translation provided by Applicant's foreign counsel.

Vivo: "UL inter-UE Tx prioritization for URLLC", 3GPP TSG RAN WG1 #98bis, R1-1910225, Chongqing, China, Oct. 4, 2019, pp. 1-12.

Notice of Allowance dated Aug. 8, 2025 for Chinese Patent Application No. 202080078859.8 and its English translation provided by Applicant's foreign counsel/Google Translate.

Office Action (1st) dated Sep. 9, 2025 for Japanese Patent Application No. 2024-181910 and its English translation provided by Applicant's foreign counsel.

Intel Corporation: "Multiplexing of UL transmissions with different data durations and latency requirements", 3GPP TSG RAN WG1 Meeting#90, R1-1712601, Prague, Czech Republic, Aug. 12, 2017, pp. 1-5.

Ericsson: "On group common PDCCH", 3GPP TSG-RAN WG1 AH-1801, R1-1800945, Vancouver, Canada, Jan. 13, 2018, pp. 1-4.

Extended European Search Report dated Oct. 7, 2025 for European Patent Application No. 25189118.0.

Notice of Allowance dated Nov. 10, 2025 for Korean Patent Application No. 10-2022-7045565 and its English translation provided by Applicant's foreign counsel.

Notice of Allowance dated Nov. 10, 2025 for Korean Patent Application No. 10-2022-7045566 and its English translation provided by Applicant's foreign counsel.

Intel Corporation: "Remaining details of multiplexing of different data channel durations", 3GPP TSG RAN WG1 Meeting 91, R1-1720099, Reno, USA, Nov. 27-Dec. 1, 2017.

* cited by examiner 1 radio frame, $T_f = \left(\Delta f_{max} N_f / 100\right) \cdot T_c = 10\,ms$ 1 sub-frame, $T_{sf} = \left(\Delta f_{max} N_f / 1000\right) \cdot T_c = 1\,ms$

| #0 | #1 | #2 | #3 | ... | #8 | #9 |

| slot#0 | slot#1 | slot#2 | slot#3 | ... | #slot#$(2^\mu-2)$ | slot#$(2^\mu-1)$ |

1 slot, $T_{slot} = \left(\Delta f_{max} N_f / 1000\right) \cdot T_c \cdot 2^{-\mu} = 2^{-\mu}\,ms$ (a) Single CC　　　　　　　　　　　　(b) Multiple CC (a)

(b)

(c)

(a)

(b)

(a)

(b)

(c)

CHANNEL MULTIPLEXING METHOD AND MULTIPLEXED CHANNEL TRANSMISSION METHOD FOR WIRELESS COMMUNICATION SYSTEM AND DEVICE USING SAME

CROSS-REFERENCE TO RELATED APPLICATIONS

This application is a continuation of U.S. patent application Ser. No. 17/884,568 filed on Aug. 10, 2022, which is a continuation of U.S. patent application Ser. No. 16/924,060 filed on Jul. 8, 2020, which is a continuation of International Patent Application No. PCT/KR2019/000562 filed on Jan. 14, 2019, which claims the priority to Korean Patent Application No. 10-2018-0004734 filed in the Korean Intellectual Property Office on Jan. 13, 2018 and Korean Patent Application No. 10-2019-0002588 filed in the Korean Intellectual Property Office on Jan. 9, 2019, the entire contents of which are incorporated herein by reference.

TECHNICAL FIELD

The present invention relates to a wireless communication system. Specifically, the present invention relates to a channel multiplexing method of a wireless communication system, a multiplexed channel transmission method and a device using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mm Wave band, in 5G communication systems, beamforming, massive multiple input/output (massive MIMO), full dimensional MIMO (FD-MIMO), array antenna, analog beamforming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE

Technical Problem

An object of an embodiment of the present invention is to provide a method and device for transmitting a signal efficiently in a wireless communication system. In addition, an object of an embodiment of the present invention is to provide a channel multiplexing method, a multiplexed channel transmission method and a device using the same in a wireless communication system.

Technical Solution

According to an embodiment of the present invention, a UE of a wireless communication system includes: a communication module; and a processor configured to control the communication module. When a second physical uplink data channel transmission of the UE is scheduled to a time-frequency resource in which uplink control information (UCI) transmission of a first physical uplink data channel of the UE is scheduled, the processor is configured to transmit the UCI to a base station of the wireless communication system in a time-frequency resource except for a time-frequency resource in which the second physical uplink data channel transmission of the UE is scheduled.

The processor may be configured to determine whether to transmit the UCI according to a type of the UCI.

The processor, when the type of the UCI is a hybrid automatic repeat request (HARQ)-ACK, may transmit the UCI, and when the type of the UCI is channel state information (CSI) part1 or CSI part2, may be configured to drop a transmission of the UCI.

The processor, when the type of the UCI is HARQ-ACK or CSI part1, may be configured to transmit the UCI, and when the type of the UCI is CSI part2, drop a transmission of the UCI.

According to an embodiment of the present invention, a UE of a wireless communication system includes: a communication module; and a processor configured to control the communication module. When physical uplink data channel transmission of the UE is scheduled in a time-frequency resource in which physical uplink control channel transmission of the UE is scheduled, the processor is configured to transmit uplink control information (UCI) of a physical uplink control channel to a base station of the wireless communication system. When the physical uplink data channel transmission of the UE is scheduled in a time-frequency resource in which the physical uplink control channel transmission of the UE is scheduled, the processor is configured to determine whether to transmit the UCI according to a type of the UCI.

The processor, when the type of the UCI is HARQ-ACK, may be configured to transmit the UCI, and when the type of the UCI is not HARQ-ACK, may be configured not to transmit the UCI.

When the physical uplink data channel transmission of the UE is scheduled in the time-frequency resource in which the physical uplink control channel transmission of the UE is scheduled, the processor may be configured to transmit the physical uplink control channel by puncturing a time resource that overlaps a time resource in which the physical uplink data channel transmission of the UE is scheduled in a time-frequency resource in which the physical uplink control channel transmission of the UE is scheduled.

When the physical uplink data channel transmission of the UE is scheduled in the time-frequency resource in which the physical uplink control channel transmission of the UE is scheduled, the processor may be configured to transmit the physical uplink data channel by puncturing the physical uplink data channel of the UE scheduled in a time-frequency resource in which the transmission of the physical uplink control channel is scheduled in a time-frequency resource in which the physical uplink data channel transmission of the UE is scheduled.

The processor may be configured to transmit the UCI of the physical uplink control channel in N symbols behind the time-frequency resource in which the physical uplink data channel is transmitted, wherein N may be a natural number.

According to an embodiment of the present invention, a UE of a wireless communication system includes: a communication module; and a processor configured to control the communication module, wherein when transmission of a first physical uplink control channel of the UE and a second physical uplink control channel of the UE is scheduled in one symbol, the processor is configured to transmit the first physical uplink control channel in a time-frequency resource in which the first physical uplink control channel is scheduled, and transmit the second physical uplink control channel in another time-frequency resource in which the first physical uplink control channel does not overlap with the scheduled time-frequency resource.

The processor may be configured to select another time-frequency resource among the plurality of time-frequency resource based on a position of a last symbol of each of a plurality of time-frequency resources configured for transmission of a physical uplink control channel in the slot.

The processor may be configured to consider a position of a last symbol of each of the plurality of time-frequency resources, and then select another time-frequency resource by considering the number of symbols of each of the plurality of time-frequency resources.

The processor may be configured to select a time-frequency resource having a last symbol equal to or ahead of the latest symbol in the time-frequency resource in which the transmission of the first physical uplink control channel is scheduled and in the time-frequency resource in which the transmission of the second physical uplink control channel is scheduled as another time-frequency resource.

Based on downlink control information (DCI) indicating transmission of at least one of two physical uplink control channels including the first physical uplink control channel and the second physical uplink control channel, the processor may be configured to determine the first physical uplink control channel and the second physical uplink control channel among the two physical uplink control channels.

The processor may be configured to determine the first physical uplink control channel and the second physical uplink control channel among the two physical uplink control channels based on a type of uplink control information (UCI) of each of the two physical uplink control channels.

The processor may be configured to determine a physical uplink control channel in which the type of the UCI is a hybrid automatic request (HARQ)-ACK among the two physical uplink control channels as the first physical uplink control channel, and determine a physical uplink control channel in which the type of the UCI is channel state information (CSI) among the two physical uplink control channels as the second physical uplink control channel.

According to an embodiment of the present invention, a UE of a wireless communication system includes: a communication module; and a processor configured to control the communication module, wherein when grant-based physical uplink data channel transmission by the UE is scheduled in a time-frequency resource in which grant-free physical uplink data channel transmission by the UE is scheduled, and there is data to be transmitted through the grant-free physical uplink data channel, the processor is configured to drop the grant-based physical uplink data channel transmission and transmit the grant-free physical uplink data channel.

When dropping the grant-based physical uplink data channel transmission and transmitting the grant-free physical uplink data channel, the processor may be configured to transmit uplink control information (UCI) to be transmitted through the grant-based physical uplink data channel through the grant-free physical uplink data channel.

When there is data to be transmitted through the grant-free physical uplink data channel, and a transmission period of the grant-free physical uplink data channel is shorter than a specific period, the processor may drop the grant-based physical uplink data channel transmission and transmit the grant-free physical uplink data channel.

According to an embodiment of the present invention, a UE operation method of a wireless communication system includes, when a second physical uplink data channel transmission of the UE is scheduled to a time-frequency resource in which uplink control information (UCI) transmission of a first physical uplink data channel of the UE is scheduled, transmitting the UCI to a base station of the wireless communication system in a time-frequency resource except for a time-frequency resource in which a second physical uplink data channel transmission of the UE is scheduled.

The transmitting the UCI includes determining whether to transmit the UCI according to a type of the UCI.

The determining whether to transmit the UCI includes: when the type of the UCI is a hybrid automatic repeat request (HARQ)-ACK, transmitting the UCI; and when the type of the UCI is channel state information (CSI) part1 or CSI part2, dropping the transmission of the UCI.

The determining whether to transmit the UCI includes: when the type of the UCI is hybrid automatic repeat request (HARQ)-ACK or channel state information (CSI) part1, transmitting the UCI; and when the type of the UCI is CSI part2, dropping the transmission of the UCI.

According to an embodiment of the present invention, a UE operation method of a wireless communication system includes, when physical uplink data channel transmission of the UE is scheduled in a time-frequency resource in which physical uplink control channel transmission of the UE is scheduled, transmitting uplink control information (UCI) of a physical uplink control channel to a base station of the wireless communication system.

The transmitting the UCI to the base station of the wireless communication system includes when the physical uplink data channel transmission of the UE is scheduled in a time-frequency resource in which the physical uplink control channel transmission of the UE is scheduled, determining whether to transmit the UCI according to the type of the UCI.

The determining the transmitting the UCI according to the type of the UCI includes when the type of the UCI is HARQ-ACK, transmitting the UCI, and when the type of the UCI is not HARQ-ACK, not transmitting the UCI.

The operation method may further include, when physical uplink data channel transmission of the UE is scheduled in the time-frequency resource in which the physical uplink control channel transmission of the UE is scheduled, transmitting the physical uplink control channel by puncturing a time resource that overlaps a time resource in which the physical uplink data channel transmission of the UE is scheduled in a time-frequency resource in which the physical uplink control channel transmission of the UE is scheduled.

The operation method may further include, when the physical uplink data channel transmission of the UE is scheduled in the time-frequency resource in which the physical uplink control channel transmission of the UE is scheduled, transmitting the physical uplink data channel by puncturing the physical uplink data channel of the UE that is scheduled in a time-frequency resource in which the transmission of the physical uplink control channel is scheduled in a time-frequency resource in which the physical uplink data channel transmission of the UE is scheduled.

The operation method may further include transmitting the UCI of the physical uplink control channel in N symbols behind the time-frequency resource in which the physical uplink data channel is transmitted, wherein N may be a natural number.

According to an embodiment of the present invention, a UE operation method of a wireless communication system includes: when transmission of a first physical uplink control channel of the UE and a second physical uplink control channel of the UE is scheduled in one symbol, transmitting the first physical uplink control channel in a time-frequency resource in which the first physical uplink control channel is scheduled, and transmitting the second physical uplink control channel in another time-frequency resource in which the first physical uplink control channel does not overlap with the scheduled time-frequency resource.

The transmitting the second physical uplink control channel may include selecting the other time-frequency resource among the plurality of time-frequency resources based on a position of a last symbol of each of a plurality of time-frequency resources configured for transmission of a physical uplink control channel in the slot.

The selecting the other time-frequency resource may include considering a position of a last symbol of each of the plurality of time-frequency resources, and then selecting the other time-frequency resources by considering the number of symbols of each of the plurality of time-frequency resources.

The transmitting the second physical uplink control channel may include selecting a time-frequency resource having a last symbol equal to or ahead of the latest symbol in the time-frequency resource in which the transmission of the first physical uplink control channel is scheduled and in the time-frequency resource in which the transmission of the second physical uplink control channel is scheduled as the other time-frequency resource.

The transmitting the second physical uplink control channel may include based on downlink control information (DCI) indicating transmission of at least one of two physical uplink control channels including the first physical uplink control channel and the second physical uplink control channel, determining the first physical uplink control channel and the second physical uplink control channel among the two physical uplink control channels.

The determining the first physical uplink control channel and the second physical uplink control channel may include determining the first physical uplink control channel and the second physical uplink control channel among the two physical uplink control channels based on a type of uplink control information (UCI) of each of the two physical uplink control channels.

The determining the first physical uplink control channel and the second physical uplink control channel among the two physical uplink control channels based on the UCI type may include determining a physical uplink control channel in which the type of the UCI is a HARQ-ACK among the two physical uplink control channels as the first physical uplink control channel, and determines a physical uplink control channel in which the type of the UCI is CSI among the two physical uplink control channels as the second physical uplink control channel.

According to an embodiment of the present invention, a UE operation method of a wireless communication system includes: when grant-based physical uplink data channel transmission by the UE is scheduled in a time-frequency resource in which grant-free physical uplink data channel transmission by the UE is scheduled, and there is data to be transmitted through the grant-free physical uplink data channel, dropping the grant-based physical uplink data channel transmission and transmitting the grant-free physical uplink data channel.

The dropping the grant based physical uplink data channel transmission and transmitting the grant-free physical uplink data channel may include, when dropping the grant-based physical uplink data channel transmission and transmitting the grant-free physical uplink data channel, transmitting uplink control information (UCI) to be transmitted through the grant-based physical uplink data channel through the grant-free physical uplink data channel.

The dropping the grant based physical uplink data channel transmission and transmitting the grant-free physical uplink data channel may include, when there is data to be transmitted through the grant-free physical uplink data channel, and a transmission period of the grant-free physical uplink data channel is shorter than a specific period, dropping the grant-based physical uplink data channel transmission and transmitting the grant free physical uplink data channel.

Advantageous Effects

One embodiment of the present invention provides a method for efficiently multiplexing channels in a wireless communication system, a method for receiving a multiplexed channel, and a device using the same.

Effects obtainable from various embodiments of the present disclosure are not limited to the above-mentioned effects, and other effects not mentioned above may be clearly derived and understood to those skilled in the art from the following description.

MODE FOR CARRYING OUT THE INVENTION

Figure 1:
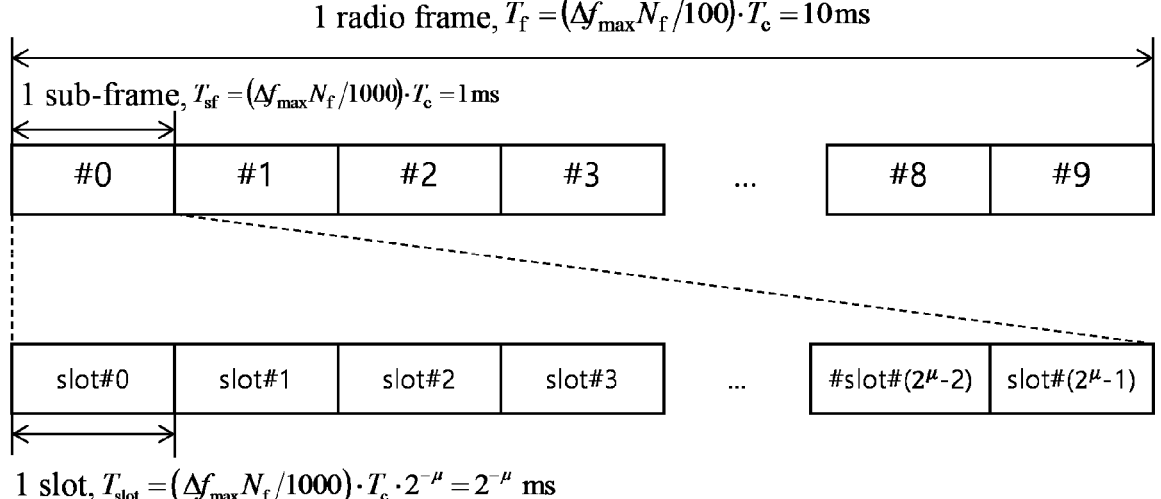
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100$)*$T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^{\mu}$ kHz, and u can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^{\mu}$ slots. In this case, the length of each slot is $2^{-\mu}$ ms. Numbers from 0 to 24-1 may be respectively allocated to $2^{\mu}$ slots within one wireless frame. In addition, numbers from 0 to $10*2^{\mu}-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
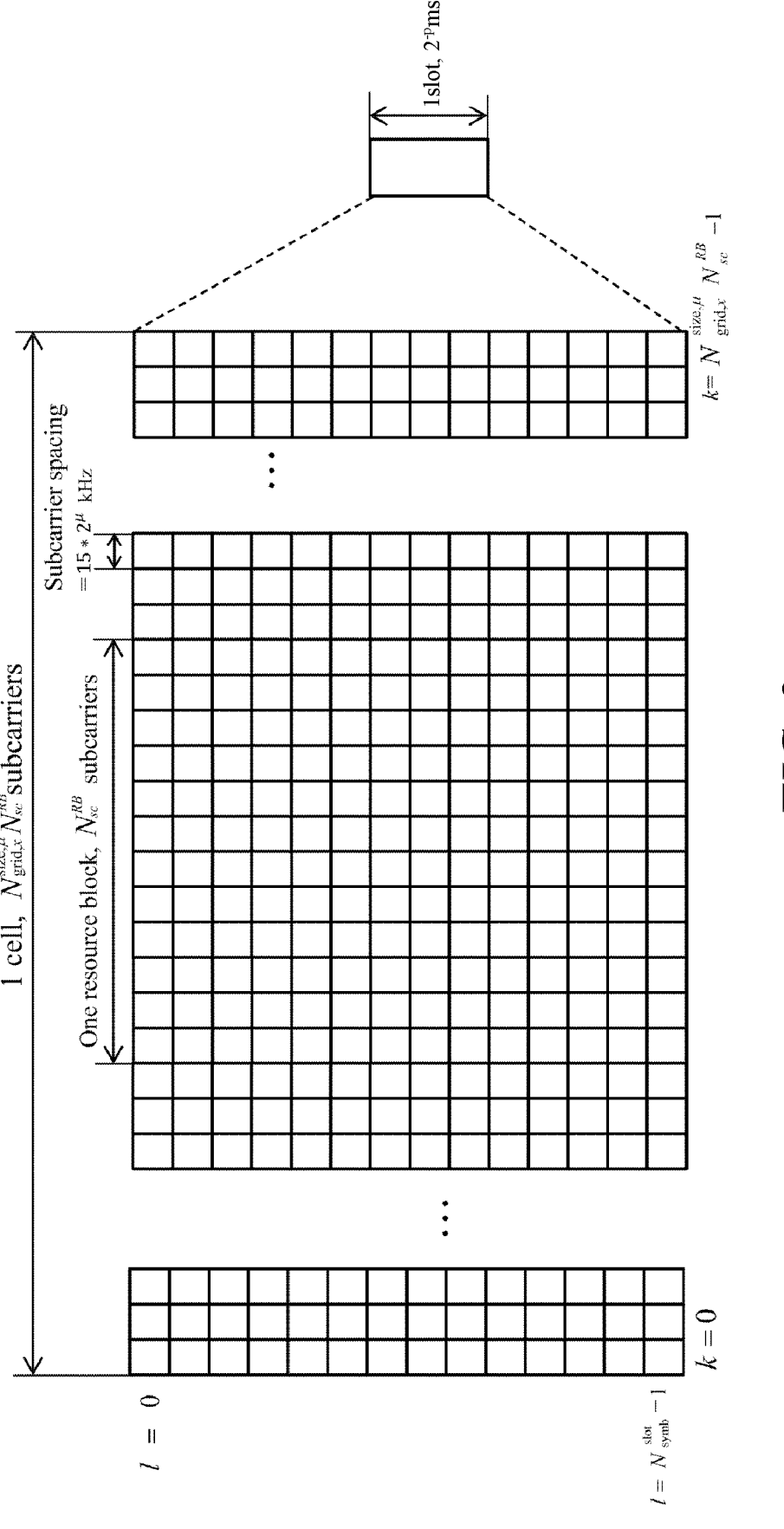
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP- OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, 1) in one slot. k may be an index assigned from 0 to $N^{size,\mu}_{grid,x}*N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| index | Symbol number in a slot | | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |

12

TABLE 1-continued

| index | Symbol number in a slot | | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | D | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56-255 | Reserved | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
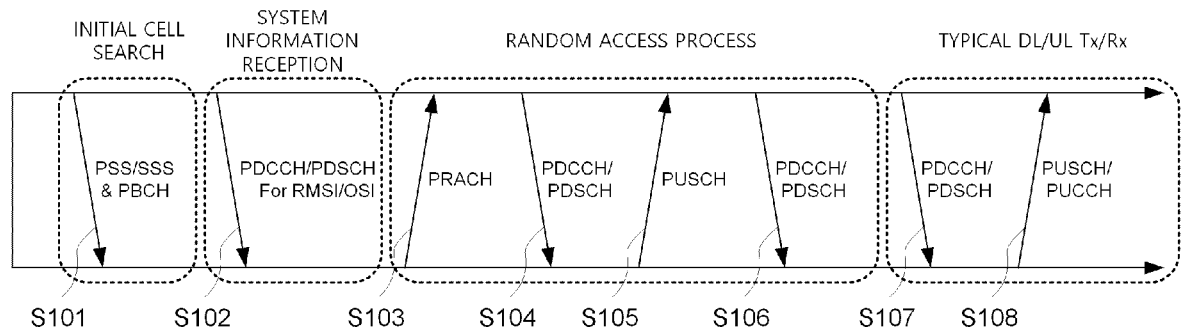
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtains the UE-specific system information, the UE enters RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
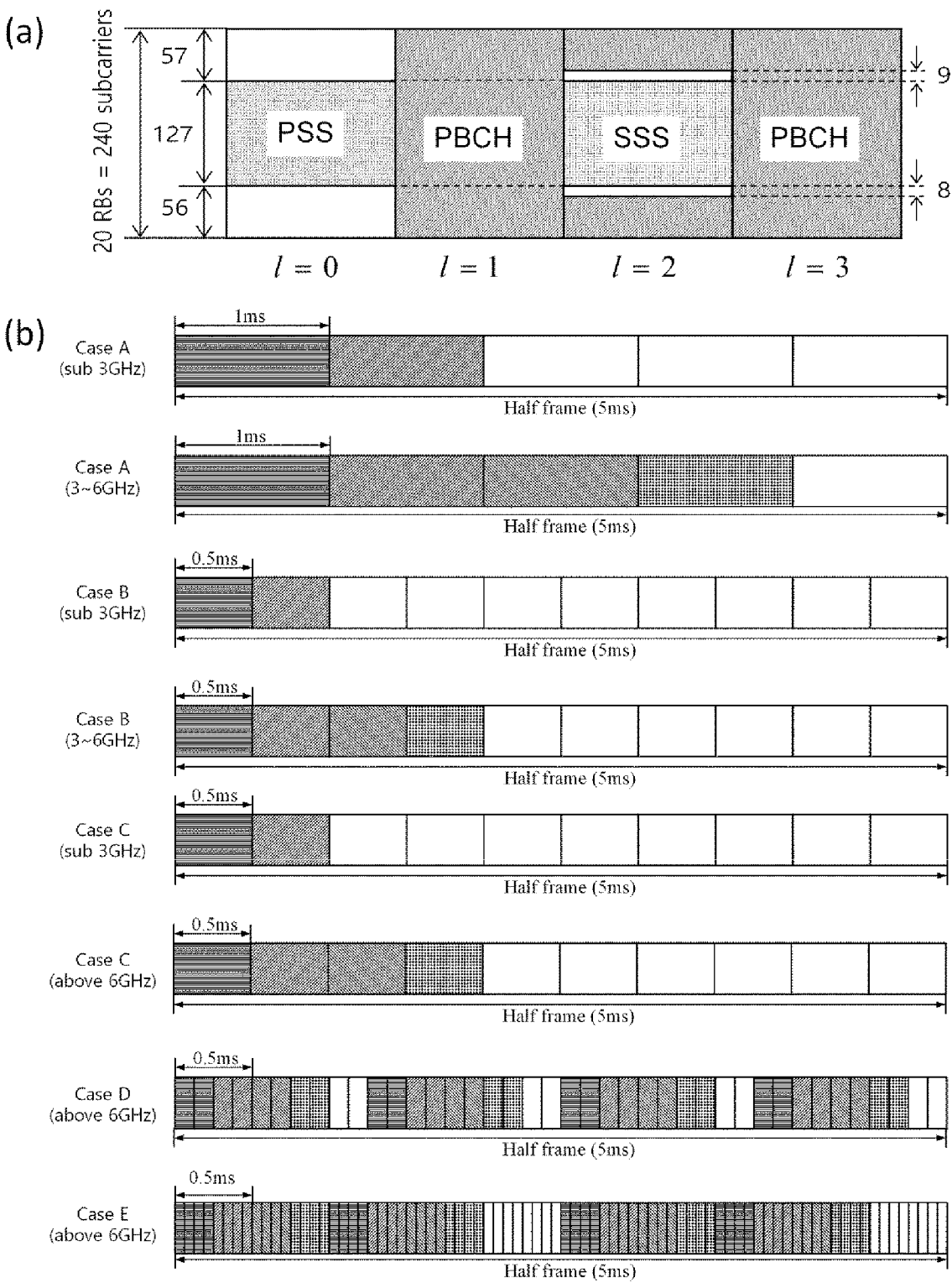
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/ relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
| | 2 | 48, 49, . . . , 55, 183, 184, . . . , 191 |
| PBCH | 1, 3 | 0, 1, . . . , 239 |
| | 2 | 0, 1, . . . , 47, 192, 193, . . . , 239 |
| DM-RS for PBCH | 1, 3 | 0 + v, 4 + v, 8 + v, . . . , 236 + v |
| | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = \left(n + 43N^{(2)}_{ID}\right)\mathrm{mod}127$$

$$0 \le n < 127$$

Here, $x(i + 7) = (x(i + 4) + x(i))\mathrm{mod}2$ and is given as $$[\,x(6)\ \ x(5)\ \ x(4)\ \ x(3)\ \ x(2)\ \ x(1)\ \ x(0)\,] = [\,1\ \ 1\ \ 1\ \ 0\ \ 1\ \ 1\ \ 0\,]$$

Further, the sequence $d_{SSS}(n)$ of the SSS is as follows.

$$d_{SSS}(n) = [1 - 2x_0((n + m_0)\mathrm{mod}127)][1 - 2x_1((n + m_1)\mathrm{mod}127)]$$

$$m_0 = 15\left\lfloor \frac{N^{(1)}_{ID}}{112} \right\rfloor + 5N^{(2)}_{ID}$$

$$m_1 = N^{(1)}_{ID}\mathrm{mod}112$$

$$0 \le n < 127$$

Here, $x_0(i + 7) = (x_0(i + 4) + x_0(i))\mathrm{mod}2$ $x_1(i + 7) = (x_1(i + 1) + x_1(i))\mathrm{mod}2$ and is given as $$[\,x_0(6)\ \ x_0(5)\ \ x_0(4)\ \ x_0(3)\ \ x_0(2)\ \ x_0(1)\ \ x_0(0)\,] = [\,0\ \ 0\ \ 0\ \ 0\ \ 0\ \ 0\ \ 1\,]$$

$$[\,x_1(6)\ \ x_1(5)\ \ x_1(4)\ \ x_1(3)\ \ x_1(2)\ \ x_1(1)\ \ x_1(0)\,] = [\,0\ \ 0\ \ 0\ \ 0\ \ 0\ \ 0\ \ 1\,]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ($\{2, 8\}+14*n$)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is $\{4, 8, 16, 20\}+28*n$. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ($\{2, 8\}+14*n$)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ($\{4, 8, 16, 20\}+28*n$)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ($\{8, 12, 16, 20, 32, 36, 40, 44\}+56*n$)-th symbol. In this case, at a carrier frequency of 6 GHz or more, n=0, 1, 2, 3, 5, 6, 7, 8.

Figure 5:
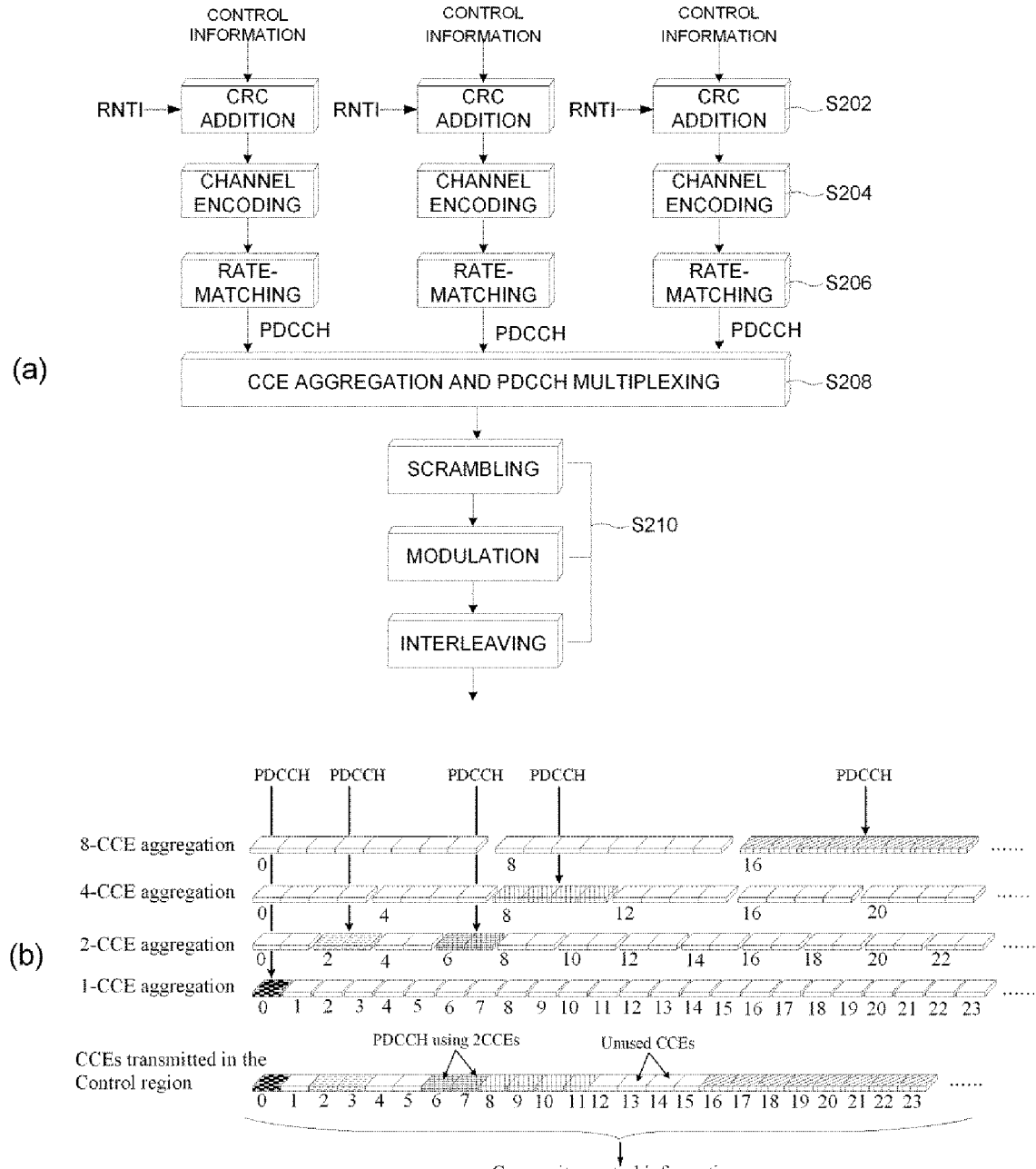
FIG. 5 illustrates a procedure for transmitting control information and a control channel in a 3GPP NR system.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
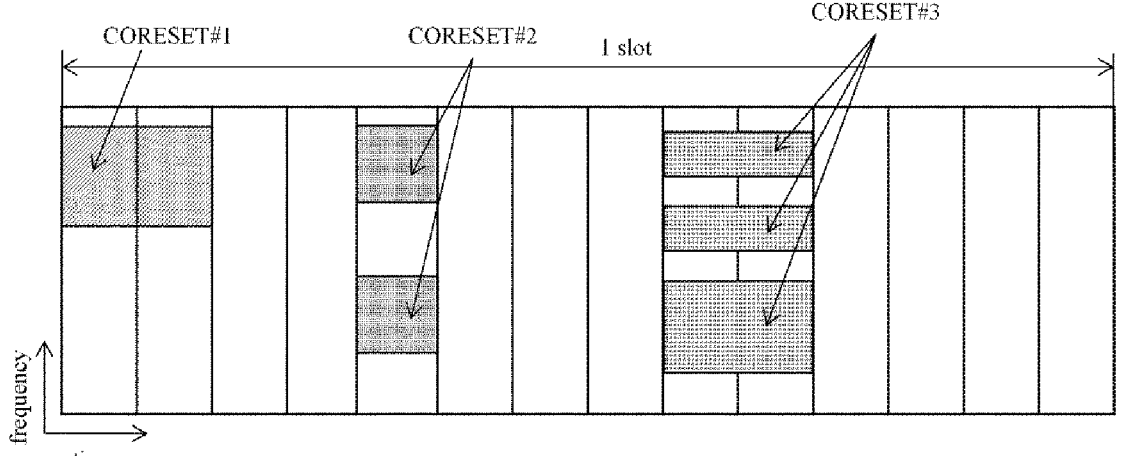
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
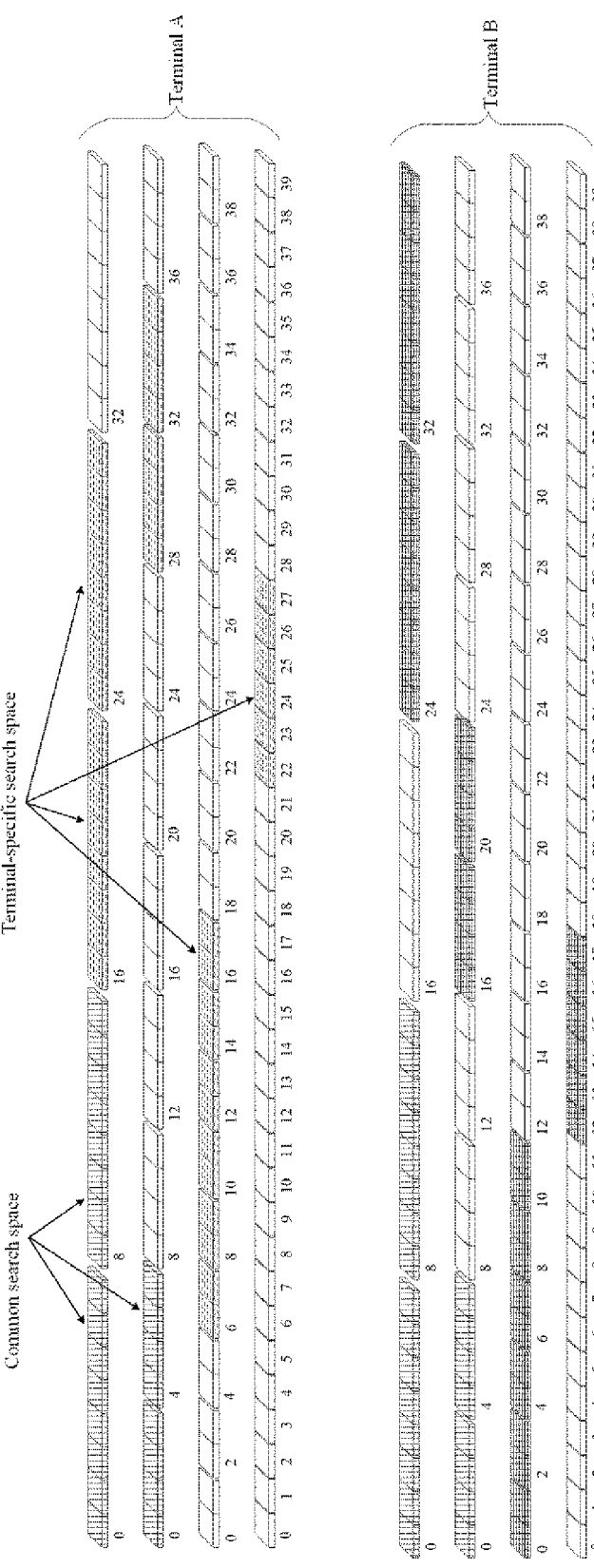
FIG. 7 illustrates a method for configuring a PDCCH search space in a 3GPP NR system.

FIG. 7 illustrates a method for setting a PUCCH search space in a 3GPP NR system. In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
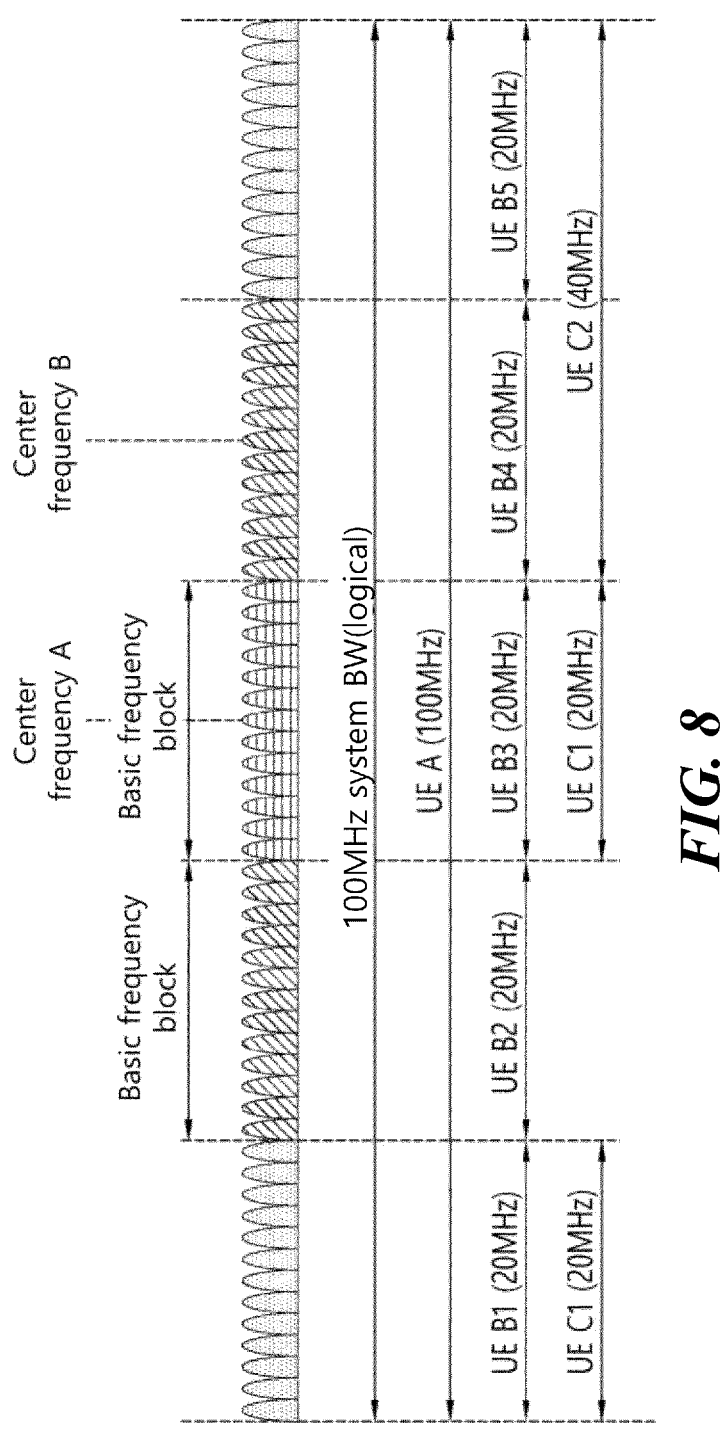
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
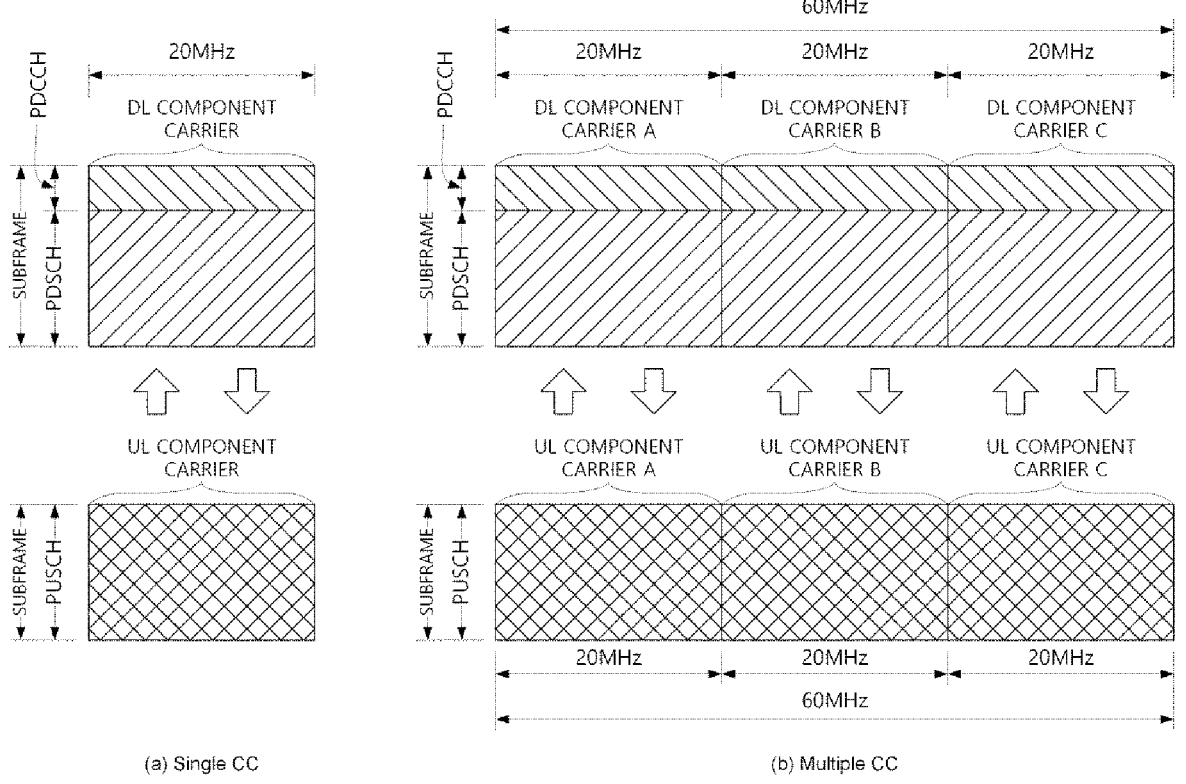
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
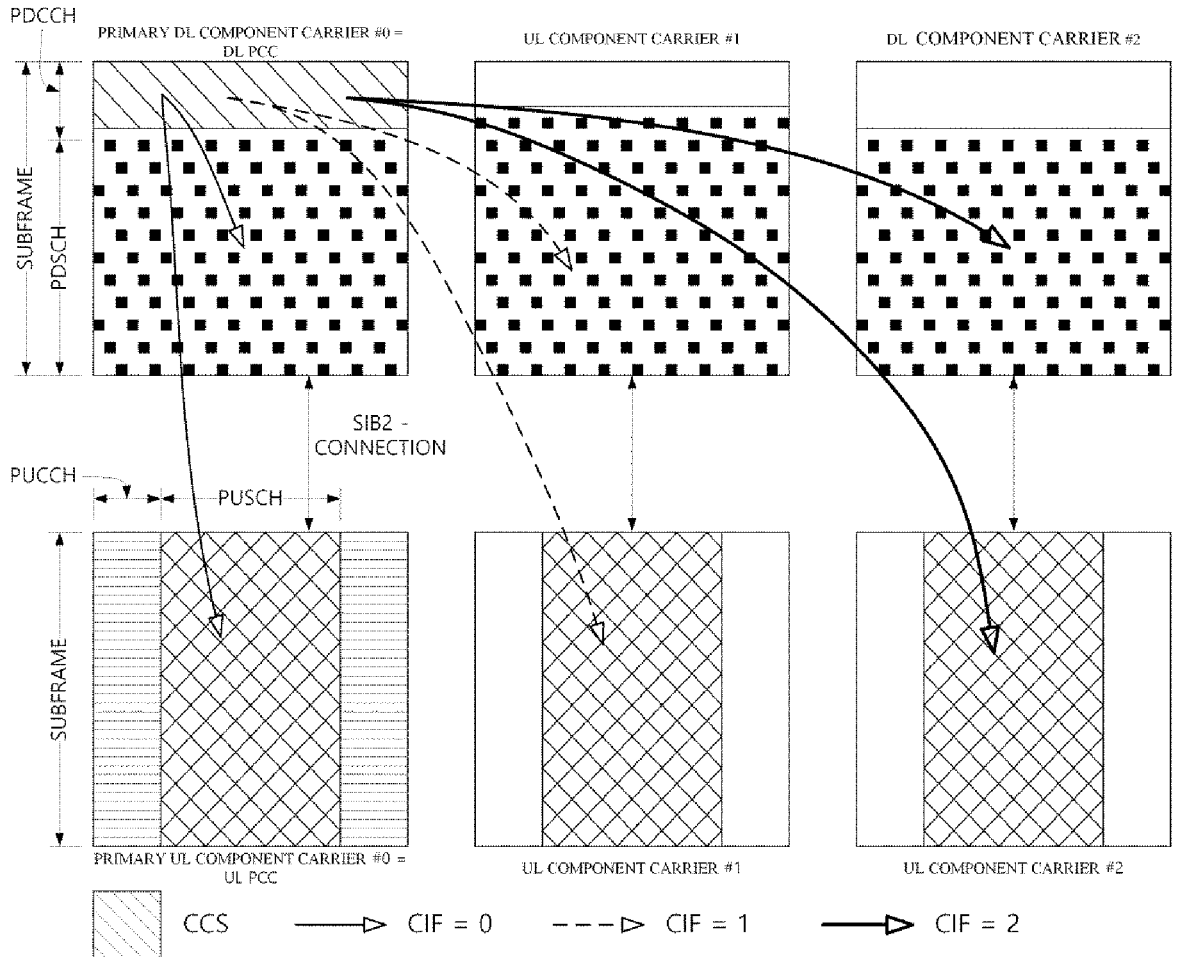
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC)

may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
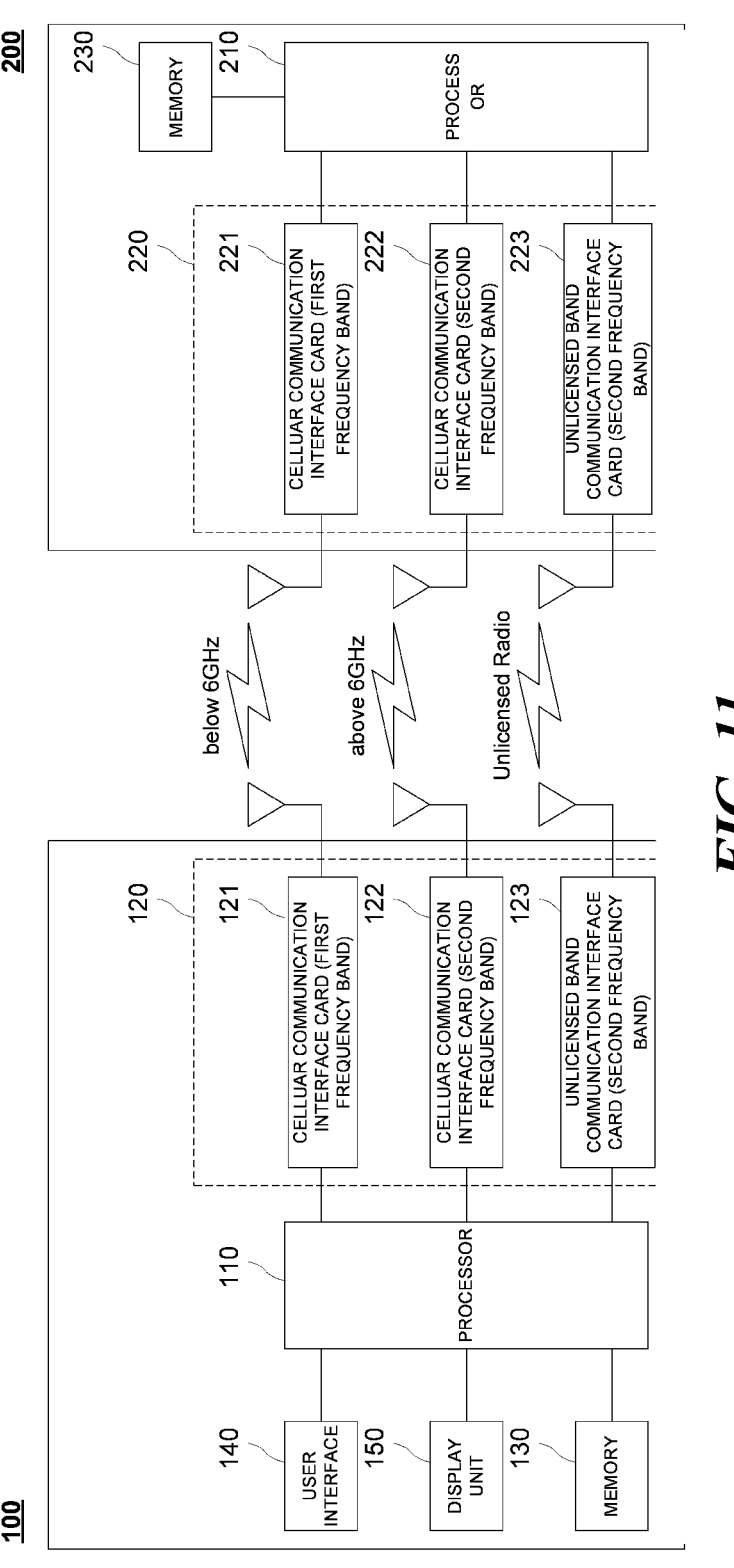
FIG. 11 is a block diagram showing the configurations of a UE and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

The base station may schedule a time-frequency resource scheduled for transmission of a physical uplink data channel of a UE to another physical uplink channel or a physical uplink channel transmission of another UE. In addition, the base station may schedule a time-frequency resource scheduled for physical uplink transmission of any one UE to other types of physical uplink transmission to be transmitted to the corresponding UE. Scheduling the time-frequency resource, which is scheduled for a specific purpose, for other purpose in such a way is called a preemption. When a time-frequency resource scheduled for physical uplink transmission of one UE is preempted for physical uplink transmission of another UE, the base station may transmit an uplink (UL) preemption indicator indicating the preempted time-frequency resource among the time-frequency resources scheduled for uplink transmission of the UE to the UE. Here, the physical uplink channel may include a physical uplink data channel or a physical uplink control channel. Preemption indicators will be described with reference to FIGS. 12 to 15.

Figure 12:
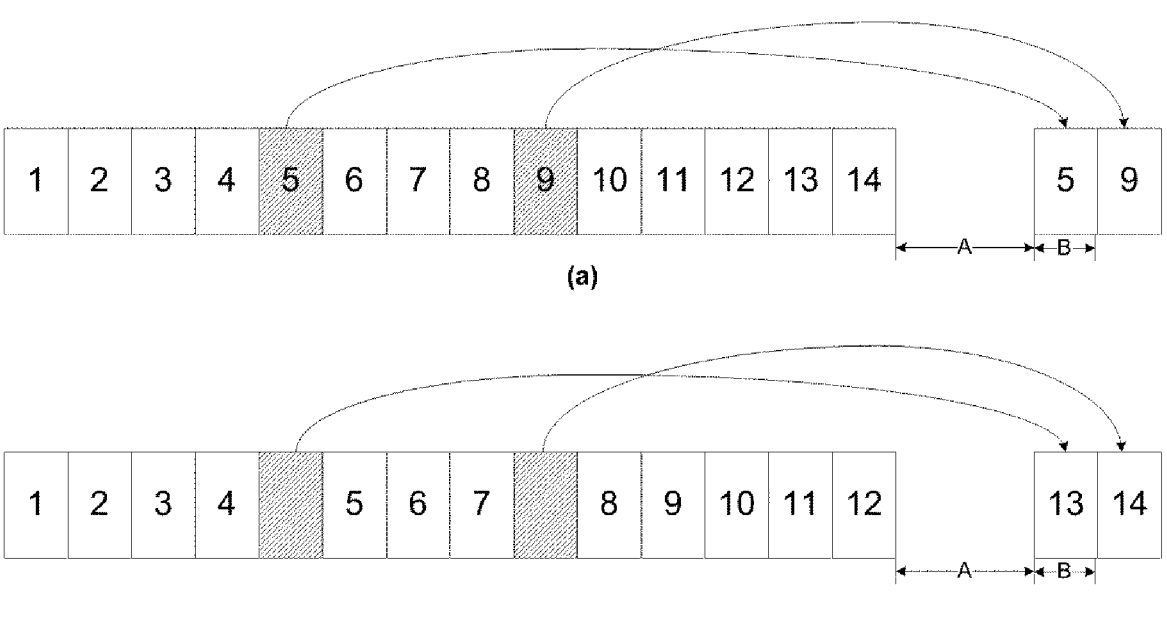
FIG. 12 shows a preemption indicator used in a wireless communication system according to an embodiment of the present invention.

FIG. 12 shows a preemption indicator used in a wireless communication system according to an embodiment of the present invention.

The base station may configure the UE to receive the UL preemption indicator using the RRC signal. The base station may transmit the UL preemption indicator to the UE through PDCCH. When the UE is configured to receive the UL preemption indicator through the RRC signal, the UE may receive the UL preemption indicator through the PDCCH. The UE may obtain at least one of a search space for the UL preemption indicator, a monitoring cycle of the UL preemption indicator, a value of the RNTI, and a length of the RNTI through the RRC signal. The UE may monitor the UL preemption indicator according to the monitoring cycle of the obtained UL preemption indicator. In addition, the UE may monitor the UL preemption indicator in the search space for the obtained UL preemption indicator. In addition, the UE may blindly decode the scrambled DCI according to the obtained RNTI value and the length of the RNTI. When the UE obtains the DCI scrambled with the value of the RNTI obtained, the UE may determine the DCI as a UL preemption indicator. The base station may configure one UL preemption indicator configuration to a plurality of UEs using the RRC signal. In this case, the PDCCH transmitting the UL preemption indicator is a group common PDCCH. The base station may configure the UL preemption indicator to one UE using the RRC signal. In this case, the PDCCH transmitting the UL preemption indicator is a UE-specific PDCCH.

The time-frequency resource in which the UL preemption indicator indicates whether to preempt may include all PRBs of the UL BWP. For convenience of description, a time-frequency resource in which the UL preemption indicator indicates whether to preempt is referred to as a reference UL time-frequency resource. When the monitoring period of the UL preemption indicator is TINT, the reference UL time time-frequency resource may be as shown in the following equation.

$$\{mT_{INT} + 1 + \Delta_{offset}, mT_{INT} + 2 + \Delta_{offset}, \dots , (m+1)T_{INT} - \Delta_{offset}\}$$

In this case, $\Delta_{offset}$ represents the offset of the time-frequency resource. Specifically, the offset of the time-frequency resource may be configured with the RRC signal.

In another specific embodiment, the offset of the time-frequency resource may be a fixed value. Also, the offset of the time-frequency resource may be a multiple of the number of symbols included in the slot. In addition, the offset of the time-frequency resource may be determined according to the PUSCH processing time of the UE. The minimum time required for the UE to receive the physical downlink control channel for scheduling the transmission of the physical uplink data channel and to generate the physical uplink data channel is referred to as Tproc. The offset of the time-frequency resource can be determined by a larger number as Tproc increases. The offset of the time-frequency resource may be a value that increases in proportion to the value of Tproc. For example, the offset of the time-frequency resource may be determined by ceil (Tproc/Symbol_duration). At this time, Symbol_duration is the duration of the OFDM symbol. In addition, ceil(X) represents the smallest integer among numbers greater than or equal to X. In addition, the UE may determine an offset of a time-frequency resource based on timing advance (TA). Specifically, the UE may determine an offset of a time-frequency resource according to a time difference between a DL frame boundary and a UL frame boundary according to TA.

The base station may perform semi-static DL/UL assignment using a cell-specific RRC signal. The semi-static DL/UL assignment may configure a symbol as one of an uplink symbol, a downlink symbol, and a flexible symbol. In this case, the uplink symbol is a symbol capable of being used for uplink transmission, and the downlink symbol is a symbol capable of being used for downlink transmission. The flexible symbol is a symbol capable of being used for uplink transmission or downlink transmission depending on a signal. The reference UL time-frequency resource may not include a downlink symbol configured according to a semi-static DL/UL assignment. That is, the reference UL time-frequency resource may include an uplink symbol and a flexible symbol configured according to semi-static DL/UL assignment. In addition, the reference UL time-frequency resource may not include a flexible symbol located immediately after the downlink symbol. In this case, the number of fully flexible symbols located immediately after the downlink symbol not included in the reference UL time-frequency resource may be one. In another specific embodiment, the number of flexible symbols located immediately after a downlink symbol not included in the reference UL time-frequency resource may be configured by an RRC signal.

The base station may configure reception of a downlink signal using a cell-specific RRC signal. The downlink signal may include an SS/PBCH block. The reference UL time-frequency resource may not include a symbol configured to receive the downlink signal. In addition, the reference UL time-frequency resource may not include a symbol located immediately after a symbol configured to receive the downlink signal. In this case, the number of symbols located immediately after the configured symbol for receiving the downlink signal that is not included in the reference UL time-frequency resource may be one. In another specific embodiment, the number of symbols located immediately after the configured symbol for receiving the downlink signal that is not included in the reference UL time-frequency resource may be configured by the RRC signal.

The UL preemption indicator may divide the reference UL time-frequency resource into N parts, and indicate whether each of the N parts is preempted. In this case, Nis a natural number. Specifically, the UL preemption indicator is a bitmap including N bits, and each of the N bits may indicate whether each of the N parts of the reference UL resource is preempted. In this case, N is a natural number. Specifically, the UL preemption indicator may be a bitmap having a length of 14 bits. In this case, the UL preemption indicator may divide the reference UL resource into 14 parts and indicate whether or not each of the 14 parts is preempted. The 14 parts of the reference UL time-frequency resource may be divided into 14 parts on the time axis. In another specific embodiment, 14 parts of the reference UL resource may be divided into 7 parts on the time axis and 2 parts on the frequency axis. A method of determining the number of symbols included in the part of the reference UL time-frequency resource will be described.

The reference UL time-frequency resource may be divided into N parts so that a difference of the number of symbols included in each part of the reference UL time-frequency resource is at most one. Specifically, when the reference UL time-frequency resource includes a total of S symbols, the mod (S, N) parts may include ceil(S/N) symbols, and the N-mod(S, N) parts may include floor (S/N) symbols. mod (X, Y) represents the remainder when X is divided by Y. ceil(X) represents the smallest integer among numbers greater than or equal to X. floor(X) represents the largest integer of the same or less than X. It can be expressed as mod(S, N)=S−floor(S/N)*N. In this case, mod (S,N) parts positioned ahead of time may include ceil(S/N) symbols. In addition, in the above-described embodiments, S and N are each natural numbers.

The UE does not transmit a physical uplink channel in a symbol which is indicated by the UL preemption indicator as being preempted, and transmits a physical uplink channel in a symbol which is indicated by the UL preemption indicator as not being preempted. In another specific embodiment, the UE may sequentially transmit the physical uplink channel in a symbol capable of transmitting the physical uplink data channel and discard the remaining physical uplink channel. In the embodiment of FIG. 12, the UE is scheduled to transmit physical uplink data channels in 14 symbols by the base station. In this case, the UL preemption indicator indicates that the 5th symbol and the 9th symbol are preempted. The UE may not transmit REs of physical uplink data channels corresponding to the 5th and 9th symbols as shown in (a) of FIG. 12. In this case, the UE may transmit REs of physical uplink data channels corresponding to the 5th and 9th symbols in the additionally allocated time-frequency resources. In addition, the UE may sequentially transmit REs of physical uplink data channels corresponding to 12 symbols as shown in (b) of FIG. 12. In this case, the UE may transmit REs of physical uplink data channels corresponding to the 13th symbol and the 14th symbol in the additionally allocated time-frequency resource.

The UE may transmit a physical uplink channel that cannot be transmitted due to preemption in a time-frequency resource different from the preempted time-frequency resource. In this case, another time-frequency resource may be a resource different from a resource for already scheduled physical uplink transmission. For convenience of description, other time-frequency resources are referred to as additional time-frequency resources. The additional time-frequency resource may be a time-frequency resource for uplink transmission temporally located behind a resource for physical uplink transmission already scheduled. The physical uplink channel scheduled for the preempted time-frequency resource and the additional time-frequency resource may have the same frequency resource. The additional time-frequency resource may be the closest symbol among symbols designated as an uplink symbol according to a semi-static DL/UL assignment from a time-frequency resource in which a physical uplink data channel scheduled on a preempted time-frequency resource is scheduled. In another specific embodiment, the additional time-frequency resource may be an uplink symbol or a flexible symbol according to a semi-static assignment from a time-frequency resource in which a physical uplink channel scheduled for a preempted time-frequency resource is scheduled. Further, the additional time-frequency resource may be a symbol located after N symbols after the physical uplink channel scheduled for the preempted time-frequency resource. In this case, N is a natural number. N can be configured through the RRC signal. In another specific embodiment, N may be a fixed number.

In a specific embodiment, the UL preemption indicator may include information on a start symbol of an additional time-frequency resource. The UE may transmit a physical uplink channel that is not transmitted due to preemption from the start symbol of the additional resource indicated by the UL preemption indicator. In the embodiment of FIG. 12, the UL preemption indicator indicates A as a start symbol of an additional time-frequency resource. As illustrated in (a) of FIG. 12, the UE may transmit RE of a PUSCH corresponding to the fifth and ninth symbols that are not transmitted due to the preemption among symbols after A from the symbol in which a PUSCH scheduled for a preempted time-frequency resource is scheduled. In (a) of FIG. 12, B is the RE length of the PUSCH corresponding to the fifth symbol. In addition, as illustrated in (b) of FIG. 12, the UE may transmit RE of a PUSCH corresponding to the 13th and 14th symbols among symbols after A from the symbol in which a PUSCH scheduled for a preempted time-frequency resource is scheduled. In (b) of FIG. 12, B is the RE length of the PUSCH corresponding to the 13th symbol.

The UL preemption indicator may indicate whether transmission of a physical uplink channel that is not transmitted due to preemption is necessary. The UE may determine whether to transmit a physical uplink channel that is not transmitted due to preemption based on the UL preemption indicator. Specifically, the UL preemption indicator may indicate whether physical uplink channels that cannot be transmitted due to preemption are transmitted through a 1-bit field. For example, when the value of the 1-bit field is 1, the UE may transmit a physical uplink channel that is not transmitted due to preemption in an additional time-frequency resource. In addition, when the value of the 1-bit field is 0, the UE may not transmit a physical uplink channel that is not transmitted due to preemption.

Figure 13:
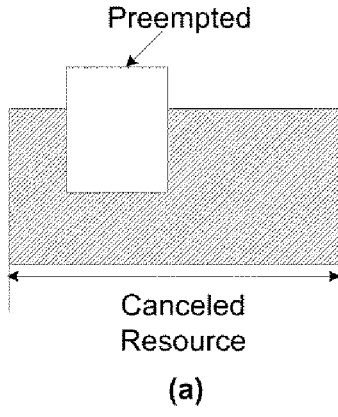
FIG. 13 shows a range of a physical uplink data channel that a UE according to an embodiment of the present invention cannot transmit due to preemption.
Figure 13:
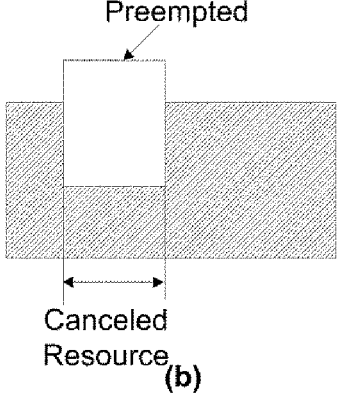
Figure 13:
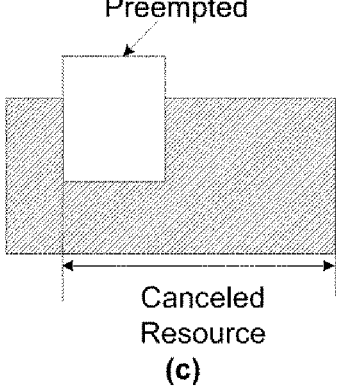

FIG. 13 shows a range of a physical uplink channel that a UE according to an embodiment of the present invention cannot transmit due to preemption.

When the time-frequency domain where the UL preemption indicator indicates that it is preempted and the time-frequency resource scheduled for transmission of the physical uplink channel of the UE partially overlap, the UE may not transmit the entire physical uplink channel. In (a) of FIG. 13, the time-frequency domain where the UL preemption indicator indicates that it is preempted and the time-frequency resource scheduled for transmission of the physical uplink channel of the UE partially overlaps. In this case, the UE does not transmit the entire physical uplink channel.

When the time-frequency domain where the UL preemption indicator indicates that it is preempted and the time-frequency resource scheduled for transmission of the physical uplink channel of the UE partially overlap, the UE may not transmit the corresponding physical uplink channel only in symbols overlapping with the time-frequency domain where the UL preemption indicator that it is preempted In (b) of FIG. 13, the time-frequency domain where the UL preemption indicator indicates that it is preempted and the time-frequency resource scheduled for transmission of the physical uplink channel of the UE partially overlaps. In this case, the UE does not transmit the corresponding physical uplink channel in the symbol overlapping the time-frequency domain where the UL preemption indicator indicates that it is preempted.

When the time-frequency domain where the UL preemption indicator indicates that it is preempted and the time-frequency resource scheduled for transmission of the physical uplink channel of the UE partially overlap, the UE may not transmit the corresponding physical uplink channel in a time-frequency resource in which transmission of the corresponding physical uplink channel is scheduled from the symbol corresponding to the time-frequency domain where the UL preemption indicator indicates that it is preempted In (c) of FIG. 13, the time-frequency domain where the UL preemption indicator indicates that it is preempted and the time-frequency resource scheduled for transmission of the physical uplink channel of the UE partially overlaps. In this case, the UE does not transmit the corresponding physical uplink channel from the symbol of the time-frequency domain where the UL preemption indicator indicates that it is preempted.

The physical uplink channel may include DMRS for channel estimation. When DMRS is not transmitted due to preemption, the base station may not receive the physical uplink channel transmitted by the UE. The UE needs to transmit a physical uplink channel that cannot be transmitted due to preemption in consideration of whether to transmit DMRS. This will be described with reference to FIG. 14.

Figure 14:
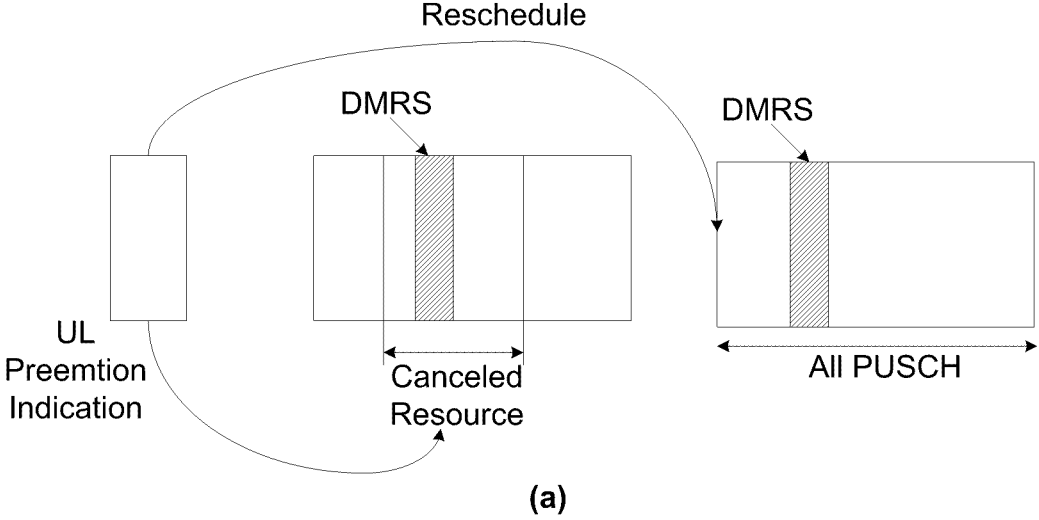
FIG. 14 shows an operation in which a UE transmits a PUSCH that cannot be transmitted due to preemption according to an embodiment of the present invention.
Figure 14:
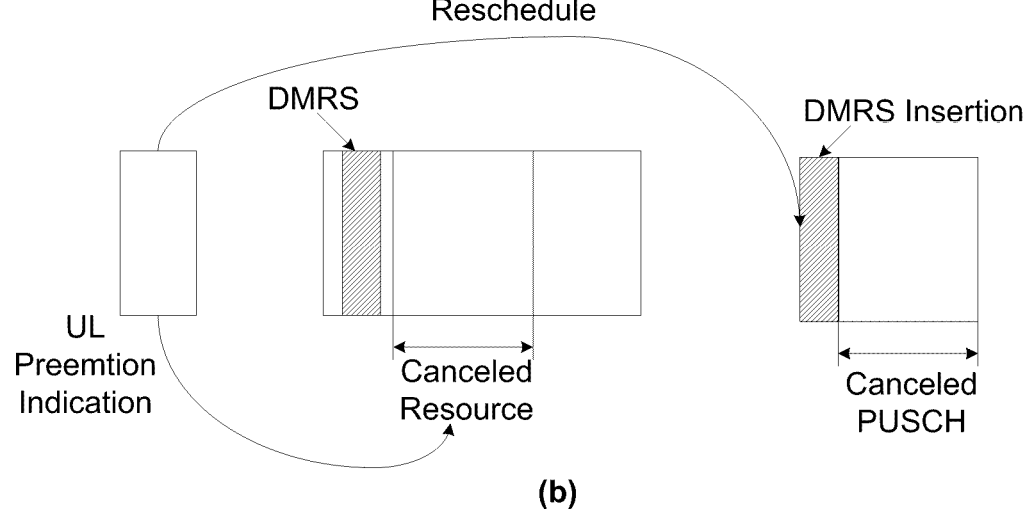

FIG. 14 shows an operation in which a UE transmits a physical uplink channel that cannot be transmitted due to preemption according to an embodiment of the present invention.

As described above, the UL preemption indicator may include information on additional time-frequency resources. The UE may transmit a physical uplink channel in the additional time-frequency resource based on the information on the additional time-frequency resource. In this case, the UE may transmit a physical uplink channel that cannot be transmitted due to preemption. In another specific embodiment, the UE may transmit the entire physical uplink channel that has not been partially transmitted due to preemption.

In this case, the information on the additional time-frequency resource may be expressed by the number of symbols or the number of slots. Specifically, the information on the additional time-frequency resource may indicate that the additional time-frequency resource is located after several symbols from the last symbol of the time-frequency resource in which preemption has been performed or the last symbol of the reference UL time-frequency resource. Alternatively, the information on the additional time-frequency resource may indicate that the additional time-frequency resource is located after several slots from the last symbol of the time-frequency resource in which preemption has been performed or the last symbol of the reference UL time-frequency resource. The symbol in which the additional time-frequency resource is located may be the most advanced symbol after the time-frequency resource in which preemption is performed among symbols assigned as uplink symbols according to semi-static DL/UL assignment. Also, a symbol in which the additional time-frequency resource is located may be a symbol indicated by DCI scheduling transmission of a physical uplink channel.

The UE may determine the type of physical uplink channel to be transmitted in additional time-frequency resources according to whether the DMRS of the physical uplink channel cannot be transmitted due to preemption. Specifically, when the UE fails to transmit the DMRS due to preemption, the UE may retransmit the entire physical uplink channel that has not partially transmitted due to preemption in additional time-frequency resources. In addition, when the UE transmits the DMRS even though preemption has occurred, the UE may transmit a part of the physical uplink channel, which was not transmitted due to preemption in the additional time-frequency resource. When the physical uplink channel that is not transmitted due to preemption does not include DMRS, the UE may transmit a part of the physical uplink channel and DMRS that are not transmitted due to preemption in additional time-frequency resources.

In the embodiment of FIG. 14, the UE determines a time-frequency resource in which preemption has occurred based on the UL preemption indicator. The UE cannot transmit a physical uplink channel due to preemption. In (a) of FIG. 14, the UE cannot transmit the DMRS of the physical uplink channel due to preemption. Therefore, UE transmits the entire physical uplink channel in the additional time-frequency resource indicated by the UL preemption indicator. In (b) of FIG. 14, the UE cannot transmit a part of the physical uplink channel due to preemption, but transmits the DMRS of the physical uplink channel. Therefore, the UE may transmit a part of the physical uplink channel, which was not transmitted due to preemption in the additional time-frequency resource. In this case, the UE transmits a part of the physical uplink channel and the DMRS.

Figure 15:
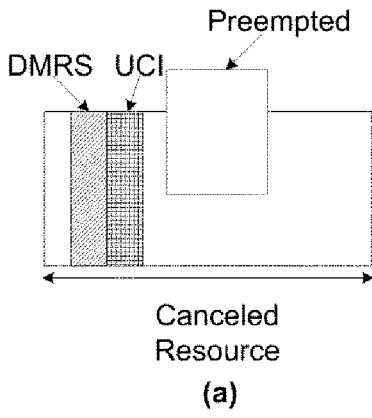
FIG. 15 shows a range of a physical uplink data channel that a UE according to another embodiment of the present invention cannot transmit due to preemption.
Figure 15:
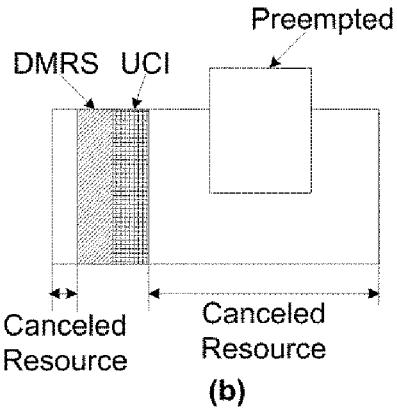
Figure 15:
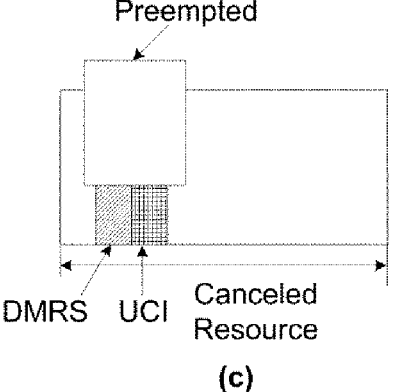

FIG. 15 shows a range of a physical uplink channel that a UE according to another embodiment of the present invention cannot transmit due to preemption.

The physical uplink data channel may include DMRS for channel estimation. In addition, the physical uplink data channel may include uplink control information (UCI). In this case, the UCI may be transmitted in the RE around the DMRS symbol. If the preemption does not affect the DMRS and UCI transmission, the UE may transmit a physical uplink data channel in the symbol where the DMRS and UCI are transmitted. In this case, the UE may not transmit a physical uplink data channel at a time-frequency where the UL preemption indicator indicates that it is preempted as shown in (a) of FIG. 15. In another specific embodiment, the UE may not transmit a physical uplink data channel in the remaining symbols except for the symbol through which the DMRS and UCI are transmitted, as shown in FIG. 15 (*b*). When preemption affects DMRS and UCI transmission, the UE may not transmit the entire physical uplink data channel as shown in (c) of FIG. 15. A case where preemption affects DMRS and UCI transmission may be a case where a time-frequency domain in which the UL preemption indicator indicates that preemption has occurred and a physical uplink channel in which transmission of DMRS or transmission of UCI is scheduled overlap.

Figure 16:
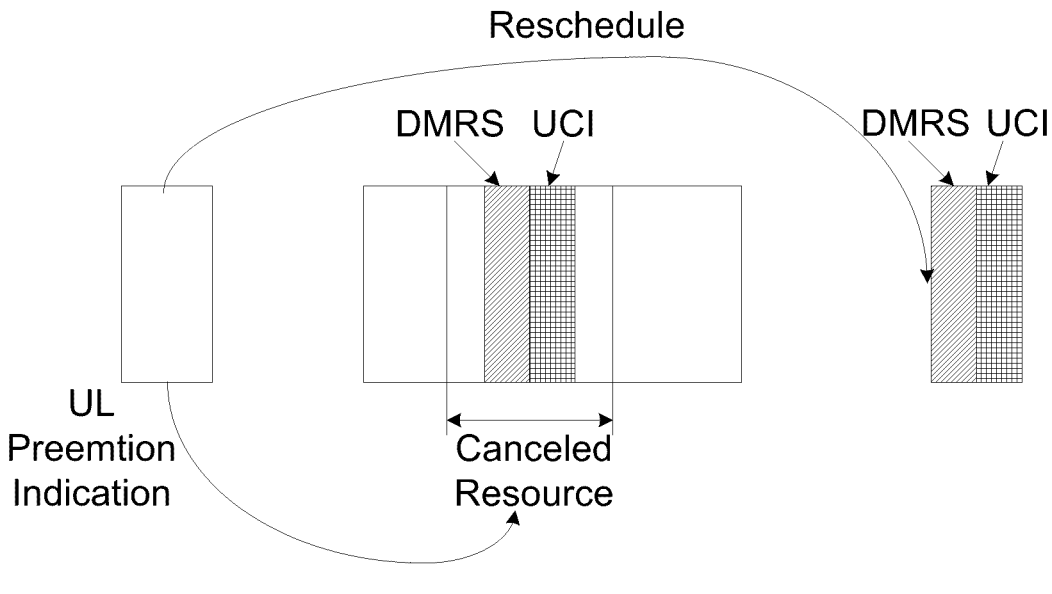
FIG. 16 shows an operation in which the UE transmits DMRS and UCI that cannot be transmitted due to preemption according to an embodiment of the present invention.

FIG. 16 shows an operation in which the UE transmits DMRS and UCI that cannot be transmitted due to preemption according to an embodiment of the present invention.

The UE may determine a type of a physical uplink data channel to be transmitted in an additional time-frequency resource according to information included in the physical uplink data channel. Specifically, depending on whether preemption affects uplink control information (UCI) transmission included in the physical uplink data channel, the UE may determine the type of physical uplink data channel to be transmitted in additional time-frequency resources. A case where the preemption affects UCI transmission included in the physical uplink data channel may be a case where at least a part of REs scheduled for UCI transmission cannot be transmitted by preemption. When the preemption does not affect the UCI transmission included in the physical uplink data channel, the UE may not transmit only the physical uplink data channel scheduled for the time-frequency resource indicated by the UL preemption indicator. In this case, the UE may not transmit a physical uplink data channel that cannot be transmitted due to preemption in an additional time-frequency resource. When the preemption affects UCI transmission included in the physical uplink data channel, the UE may not transmit the entire physical uplink data channel or the physical uplink data channel indicated by the UL preemption indicator. In this case, the UE may transmit the entire physical uplink data channel or the physical uplink data channel indicated by the UL preemption indicator in the additional time-frequency resource. In this case, the UE may transmit a physical uplink data channel including only UCI in additional time-frequency resources. Specifically, the UE may transmit a physical uplink data channel except for a symbol to which only an uplink shared channel (UL-SCH) is mapped in the physical uplink data channel. In another specific embodiment, the UE may transmit a physical uplink data channel except for a RE in which an uplink shared channel (UL-SCH) is mapped in the physical uplink data channel. In another specific embodiment, the UE may transmit a physical uplink data channel including both UL-SCH and UCI in additional time-frequency resources. In this embodiment, the UCI may be limited to HARQ-ACK information only. Alternatively, the UCI may include HARQ-ACK information and CSI. In the embodiment of FIG. 16, the UL preemption indicator indicates that REs scheduled for DMRS and UCI transmission are preempted. Therefore, the UE does not transmit the entire physical uplink data channel or the physical uplink data channel indicated by the UL preemption indicator. The UE transmits a physical uplink data channel including only DMRS and UCI in an additional time-frequency resource indicated by the UL preemption indicator.

Specifically, depending on whether preemption affects transmission of at least one of UCI and DMRS included in the physical uplink data channel, the UE may determine the type of physical uplink data channel to be transmitted in additional time-frequency resources. A case where the transmission of the UCI included in the physical uplink data channel or the transmission of the DMRS is affected may be a case where at least a part of the RE in which the UCI transmission is scheduled and the RE in which the DMRS transmission is scheduled cannot be transmitted by the preemption. If the preemption does not affect the transmission of UCI or DMRS included in the physical uplink data channel, the UE may not transmit the scheduled physical uplink data channel in the time-frequency resource indicated by the UL preemption indicator. In this case, the UE may not transmit a physical uplink data channel that cannot be transmitted due to preemption in an additional time-frequency resource. When the preemption affects the transmission of UCI or DMRS included in the physical uplink data channel, the UE may not transmit the entire physical uplink data channel. In this case, the UE may transmit the entire physical uplink data channel in the additional time-frequency resource. In this case, the UE may transmit a physical uplink data channel including only UCI in additional time-frequency resources. In another specific embodiment, the UE may transmit a physical uplink data channel including both UL-SCH and UCI in additional time-frequency resources. In this embodiment, the UCI may be limited to HARQ-ACK information only. Alternatively, the UCI may include HARQ-ACK information and CSI.

When a UE in which a physical uplink channel is preempted from UL preemption indication transmits a physical uplink channel preempted through an additional time-frequency resource, the UE may receive another UL preemption indicator. As such, when preemption occurs in the additional time-frequency resource, the UE may not transmit a physical uplink channel in the additional time-frequency resource. In this case, based on the UL preemption indicator indicating the preemption in the additional time-frequency resource, the UE may transmit, in a new additional time-frequency resource, a physical uplink channel that is not transmitted by the preemption. Specifically, when the UL preemption indicator indicating preemption in the additional time-frequency resource indicates a new additional time-frequency resource, the UE may transmit, in the new additional time-frequency resource, a physical uplink channel that is not transmitted by preemption. In another specific embodiment, even if the UL preemption indicator indicating the preemption in the additional time-frequency resource indicates a new additional time-frequency resource, the UE may not transmit, in a new additional time-frequency resource, a physical uplink channel that cannot be transmitted by the preemption.

When the physical uplink control channel is preempted, the UE may determine whether to transmit the physical uplink control channel according to information included in the physical uplink control channel in the additional time-frequency resource. Specifically, when the physical uplink control channel includes HARQ-ACK, and preemption affects the physical uplink control channel transmission, the UE may not transmit on the time-frequency resource in which the corresponding physical uplink control channel transmission is scheduled. In this case, the UE may transmit a physical uplink control channel that cannot be transmitted due to preemption in an additional time-frequency resource.

In the above-described embodiments, a method of transmitting a physical channel of a UE has been described when a time-frequency resource scheduled for uplink transmission of the UE is used by another UE. The base station may reschedule time-frequency resources scheduled for uplink transmission of the UE to other uplink transmission of the corresponding UE in consideration of differences in reliability and differences in QoS conditions. Specifically, the base station may schedule physical uplink transmission including URLLC data in a time-frequency resource in which the physical uplink transmission of the UE is scheduled. Specifically, transmission of a physical uplink channel including URLLC data of the UE may be scheduled in a time-frequency resource in which transmission of UCI transmitted in the PUSCH/PUCCH of the UE is scheduled. In this case, the UCI may be any one of HARQ-ACK and CSI. In this case, methods of a UE to transmit the UCI and drop the UCI transmission need to be defined. In addition, the UE needs to multiplex data transmissions having different QoS conditions and different transmission durations. In addition, the UE needs to multiplex data transmissions requiring different reliability. Embodiments for such transmission will be described.

A case where physical uplink data channel transmission of data having a relatively low priority by the UE is preempted by physical uplink data channel transmission of data having a relatively high priority by the UE will be described first. In this specification, the priority may be replaced by at least one of QoS conditions and reliability conditions. For convenience of description, data having a relatively low priority is referred to as general data, and data having a higher priority than general data is referred to as priority data.

When the physical uplink data channel transmission of the priority data of the UE is scheduled in the time-frequency resource in which the UCI transmission of the physical uplink data channel of the general data including the UCI of the UE is scheduled, the UE may transmit UCI of a physical uplink data channel of the general data. Specifically, when the physical uplink data channel transmission of the priority data of the UE is scheduled in the time-frequency resource in which the UCI transmission of the physical uplink data channel of the UE is scheduled, the UE may transmit the UCI of the physical uplink data channel of the general data by mapping the UCI of the physical uplink data channel of the general data to the remaining time-frequency resources that exclude the time-frequency resource scheduled for the physical uplink data channel transmission of the priority data from the time-frequency resource scheduled for transmission of the physical uplink data channel of the general data. When the time-frequency resource in which the UCI transmission of the physical uplink data channel of the general data of the UE is scheduled does not overlap with the physical uplink data channel transmission of the UE's priority data, the UE may transmit the physical uplink data channel of the general data scheduled in the time-frequency resource except the time-frequency resource in which the physical uplink data channel transmission of the priority data is scheduled.

In another specific embodiment, when the physical uplink data channel transmission of the priority data of the UE is scheduled in the time-frequency resource in which the UCI transmission of the physical uplink data channel of the general data including the UCI of the UE is scheduled, the UE may determine whether to transmit UCI according to the type of UCI. When UCI is HARQ-ACK, the UE may transmit UCI by mapping the RE of the physical uplink data channel of the general data to the remaining time-frequency resources that exclude the time-frequency resource in which the physical uplink data channel transmission of the priority data is scheduled from a time-frequency resource in which transmission of a physical uplink data channel of the general data is scheduled. In addition, when the UCI is CSI part1 or CSI part2, the UE may drop UCI transmission. When HARQ-ACK transmission is dropped, downlink transmission throughput may be reduced. This can be prevented through the above-described embodiment.

In another specific embodiment, when the UCI is HARQ-ACK or CSI part1, the UE may transmit UCI by mapping the RE of the physical uplink data channel of the general data to the remaining time-frequency resources that exclude the time-frequency resource in which the physical uplink data channel transmission of the priority data is scheduled from a time-frequency resource in which transmission of a physical uplink data channel of the general data is scheduled. In addition, when the UCI is CSI part2, the UE may drop UCI transmission. When the HARQ-ACK and CSI part1 transmission is dropped, downlink transmission throughput may be reduced. This can be prevented through the above-described embodiment.

In the above-described embodiments, the physical uplink data channel transmission of the priority data of the UE may be scheduled in the time-frequency resource in which all UCI transmission of the physical uplink data channel of the general data including the UCI of the UE is scheduled. In this case, the UE may transmit all UCIs of the physical uplink data channel of the general data in the remaining time-frequency resources that exclude the time-frequency resource in which the physical uplink data channel transmission of the priority data is scheduled from a time-frequency resource in which transmission of a physical uplink data channel of the general data is scheduled. In addition, physical uplink data channel transmission of the UE's priority data may be scheduled in a time-frequency resource in which some UCI transmission of the physical uplink data channel of the UE's general data is scheduled. In this case, the UE may transmit some overlapping UCIs of the physical uplink data channel of the general data in the remaining time-frequency resources that exclude the time-frequency resource in which the physical uplink data channel transmission of the priority data is scheduled from a time-frequency resource in which transmission of a physical uplink data channel of the general data is scheduled.

A case where the physical uplink control channel transmission of data (general data) having a relatively low priority by the UE is preempted by the physical uplink data channel transmission of data (priority data) having a relatively high priority by the UE will be described.

When the physical uplink data channel transmission of the priority data of the UE is scheduled in the time-frequency resource in which the transmission of the physical uplink control channel of the general data of the UE is scheduled, the UE may drop the transmission of the physical uplink control channel of the UE's general data. Specifically, the UE may drop a physical uplink control channel transmission of a specific cell group in which a physical uplink control channel of the priority data is scheduled. This is because inter-modulation distortion (IMD) may occur when a physical uplink control channel and a physical uplink data channel are simultaneously transmitted from different frequency resources.

In another specific embodiment, when the physical uplink data channel transmission of the priority data of the UE is scheduled in the time-frequency resource in which the transmission of the physical uplink control channel of the general data of the UE is scheduled, the UE may determine whether to drop the transmission of the physical uplink control channel according to the type of UCI of the physical uplink control channel. Specifically, the UE may determine whether to drop the transmission of the physical uplink control channel according to whether the UCI of the physical uplink control channel includes HARQ-ACK. When the UCI of the physical uplink control channel does not include HARQ-ACK, the UE may drop transmission of the physical uplink control channel. When the UCI of the physical uplink control channel includes HARQ-ACK, the UE may multiplex the physical uplink control channel and the physical uplink data channel of the priority data to transmit the physical uplink control channel and the physical uplink data channel of the priority data. A method of multiplexing a physical uplink control channel and a physical uplink data channel of the priority data will be described.

In order not to allow the symbol in which the physical uplink data channel of the priority data is transmitted in one slot overlaps with the physical uplink data channel of the general data, the UE may transmit a physical uplink data channel of priority data and a physical uplink control channel of the general data through time division multiplexing (TDM). Specifically, the UE may transmit a physical uplink control channel of the general data using a shortened physical uplink control channel format in a symbol which does not overlap with the physical uplink data channel of the priority data. In this case, the shortened physical uplink control channel format may be in the form of a physical uplink control channel in which some of the time domains in which the corresponding physical uplink control channel is scheduled are punctured. Specifically, it may be a shortened PUCCH format. Through this, the physical uplink data channel and the physical uplink control channel may be simultaneously transmitted to prevent the IMD from occurring. In this case, the symbol may be a DFTs-OFDM symbol or an OFDM symbol. In a specific embodiment, when the physical uplink data channel of the priority data is transmitted in consecutive symbols, the UE may transmit a physical uplink data channel of the priority data and a physical uplink control channel of the general data together in one slot using TDM at a symbol level. When a physical uplink data channel of the priority data is transmitted in a discontinuous symbol, the UE may drop transmission of a physical uplink control channel of the general data. This is because the shortened physical uplink control channel format cannot be used.

The UE may puncture the time-frequency resource in which the physical uplink control channel transmission of the general data is scheduled in the time-frequency resource in which the physical uplink data channel of the priority data is scheduled to transmit a physical uplink data channel of priority data. This is because physical uplink control channel reception including HARQ-ACK may be necessary according to QoS and requirements of downlink data. When the base station schedules the transmission of the priority data, the base station may determine that a part of the priority data is punctured to transmit a physical uplink control channel of the general data. Even if a part of the priority data is punctured so that a physical uplink control channel of the general data is transmitted, the base station can receive the priority data. In addition, even if a physical uplink control channel and a physical uplink data channel are transmitted in the same symbol, there is no frequency separation between the two channels, so that IMD may not occur.

The UE may piggyback the physical uplink control channel of the general data to the physical uplink data channel of the priority data to transmit it. In this case, the UE may not directly and simultaneously transmit the physical uplink data channel of the priority data and the physical uplink control channel of the general data. Specifically, the UE may first piggyback the UCI to be transmitted through the physical uplink control channel of the general data to the physical uplink data channel of the data and transmit it. The UE piggybacks all UCIs to the physical uplink data channel of the priority data to transmit it. In another specific embodiment, the UE may determine whether to transmit the UCI by piggybacking the UCI to the physical uplink data channel of the priority data according to the type of the UCI. For example, when the type of the UCI is HARQ-ACK, the UE may transmit the UCI by piggybacking the UCI to the physical uplink data channel of the priority data. Or, when the type of UCI is HARQ-ACK or CSI part1, the UE may piggyback the UCI to the physical uplink data channel of priority data to transmit it.

The UE may transmit the UCI to be transmitted through the physical uplink control channel of the general data through the N symbols following the physical uplink data channel of the priority data. In this case, N is a natural number. Specifically, the UE may designate N symbols after a physical uplink data channel of the priority data as a reserved symbol, and transmit the UCI to be transmitted through the physical uplink control channel of the general data through the N symbols.

The base station may schedule the physical uplink data channel of the priority data in consideration of the UCI size of the physical uplink control channel of the general data. Specifically, the base station may schedule the UCI of the physical uplink data channel of the priority data and the physical uplink control channel of the general data so as not to overlap in consideration of the UCI size of the physical uplink control channel of the general data.

In the above-described embodiments, it has been described that physical uplink data channel transmission of the priority data is scheduled again in a time-frequency resource in which physical uplink control channel transmission is scheduled. However, the above-described embodiments may be applied even when a physical uplink data channel transmission of other priority data is scheduled when a time-frequency resource in which the physical uplink control channel transmission of the priority data is scheduled is scheduled. That is, the above-described embodiments may be applied even when the physical uplink data channel transmission of other data having the same priority is scheduled in the time-frequency resource in which the physical uplink control channel transmission of any one data is scheduled.

A case where a physical uplink control channel transmission of data having a relatively low priority (general data) by the UE and a physical uplink control channel transmission of data having a relatively high priority (priority data) by the UE are configured in the one symbol, or a case where the physical uplink control channel transmissions of data having the same priority by the UE is configured in the one symbol will be described. In this case, the UE may transmit UCIs of two physical uplink control channels scheduled on the one symbol using one physical uplink control channel in a slot in which two physical uplink control channels are scheduled. In this case, a method in which the UE selects a time frequency resource to transmit the one physical uplink control channel may be a problem. In addition, the UE may transmit the one physical uplink control channel of the two physical uplink control channels scheduled in the one symbol in a first scheduled time-frequency resource, and transmit the remaining physical uplink control channels in different time frequency resources that do not overlap with any one physical uplink control channel. In this case, a method in which the UE selects a time-frequency resource to transmit the remaining physical uplink control channel may be a problem. A method in which a UE selects a time-frequency resource in which one physical uplink control channel including UCIs of two physical uplink control channels scheduled in the same symbol will be transmitted or another time-frequency resource in which the remaining physical uplink control channel will be transmitted will be described in detail with reference to FIG. 17. In addition, for convenience of description, a physical uplink channel transmitting UCI of two physical uplink control channels scheduled on the one symbol or a physical uplink control channel transmitted in another time-frequency resource among two physical uplink control channels is referred to as an alternate physical uplink control channel. A time-frequency resource in which the alternate physical uplink control channel transmission is scheduled is referred to as an alternate time-frequency resource.

Figure 17:
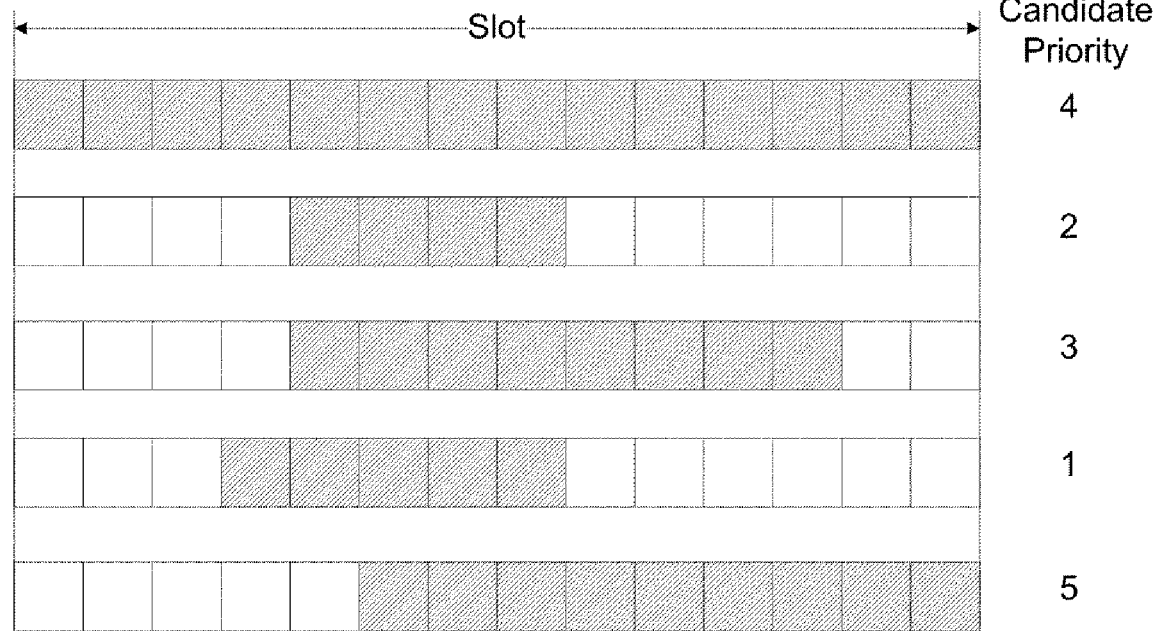
FIG. 17 shows a method for a UE to select an alternate physical uplink control channel according to an embodiment of the present invention.

FIG. 17 shows a method for a UE to select an alternate physical uplink control channel according to an embodiment of the present invention.

The base station may configure a plurality of time-frequency resources in which the UE may transmit a physical uplink control channel in one slot. The UE may select one time-frequency resource among a plurality of time-frequency resources and transmit an alternate physical uplink control channel in the selected time-frequency resource.

The UE may determine an alternate time-frequency resource to transmit the alternate physical uplink control channel based on the positions of the last symbols of the time-frequency resources occupied by the plurality of physical uplink control channels configured by the base station in the slots in which two physical uplink control channels are configured. Specifically, the UE may select a time-frequency resource of a physical uplink control channel in which the last symbol is the most advanced among the time-frequency resources of a plurality of physical uplink channels in a slot configured with two physical uplink control channels as an alternative time-frequency resource, and transmit it to the alternate physical uplink control channel through the selected alternate time-frequency resource.

The time-frequency resource of the physical uplink control channel in which the last symbol is the most advanced may be plural. In this case, the UE may select an alternative time-frequency resource based on the number of symbols of the time-frequency resource of the physical uplink control channel after the last symbol position of the time-frequency resource of the physical uplink control channel. Specifically, the UE may select a time-frequency resource of the physical uplink control channel having the longest length (the largest number of symbols) among the time-frequency resources of the physical uplink control channel in which the last symbol is the most advanced as the alternative time-frequency resource. The UE may transmit an alternate physical uplink control channel through the selected alternate time-frequency resource. That is, the UE may select a physical uplink control channel time-frequency resource to transmit the alternate physical uplink control channel in consideration of the position of the start symbol of the time-frequency resource of the physical uplink control channel after the position of the last symbol of the time-frequency resource of the physical uplink control channel.

When a plurality of physical uplink control channel time-frequency resources are selected based on the length of the physical uplink control channel time-frequency resource after the last symbol position of the time-frequency resource of the physical uplink control channel, the UE may arbitrarily select one of the time-frequency resources of the selected plurality of physical uplink control channels and transmit the alternate physical uplink control channel through the selected time-frequency resource. For example, in step 1, the UE may select a time-frequency resource of a physical uplink control channel in which the last symbol is the most advanced among channel time-frequency resources of a plurality of physical uplink controls in a predetermined slot as a first candidate alternative time-frequency resource set. If the first candidate alternative time-frequency resource set includes a plurality of physical uplink control channel time-frequency resources, in step 2, the UE may select the time-frequency resource of the physical uplink control channel having the longest length in the first candidate alternative time-frequency set as the second candidate alternative time-frequency set. If the second candidate alternative time-frequency resource set includes a plurality of physical uplink control channel time-frequency resources, in step 3, the UE randomly may select a time-frequency resource of any one physical uplink control channel from the second candidate alternative time-frequency resource set to select it as an alternative time-frequency resource, and transmit the alternate physical uplink control channel in the selected alternative time-frequency resource. If there is one time-frequency resource of the physical uplink control channel corresponding to the alternative time-frequency set, the UE may select a time-frequency resource of the corresponding physical uplink control channel as an alternative time-frequency resource without additional selection and transmit the alternate physical uplink control channel through the selected alternative time-frequency resource.

In the embodiment of FIG. 17, time-frequency resources of five physical uplink control channels are configured in slots in which two physical uplink control channel transmissions are scheduled in the one symbol. In this case, the UE selects the second and fourth physical uplink control channel time-frequency resources in which the position of the last symbol is the most advanced among the time-frequency resources of the 5 physical uplink control channels as the time-frequency resource set of the first candidate physical uplink channel. In addition, the UE selects the time-frequency resource of the fourth physical uplink control channel having the longest length (the largest number of symbols) in the time-frequency resource set of the first candidate physical uplink control channel as the time-frequency resource set of the second candidate physical uplink control channel. Since the time-frequency resource of the physical uplink control channel included in the time-frequency resource set of the second candidate physical uplink control channel is 1, the UE transmits an alternate physical uplink control channel through a fourth physical uplink control channel time-frequency resource.

The UE may select an alternate physical uplink control channel from the physical uplink control channels scheduled for the time-frequency resource having the same or earlier symbol than the last symbol in the two time-frequency resources scheduled in the one symbol. This operation may be applied to the above-described embodiments.

For example, in step 1, the UE may select a physical uplink control channel time-frequency resource having a last symbol that is the same as or before the latest symbol in the time-frequency resources of a plurality of physical uplink control channels in a given slot among the time-frequency resources in which two physical uplink control channels in which the last symbol is scheduled in the one symbol are scheduled as a first candidate physical uplink control channel set. In step 2, the UE may select the time-frequency resource of the physical uplink control channel in which the last symbol is the most advanced in the first candidate physical uplink control channel set as the second candidate physical uplink control channel time-frequency resource set. When the second candidate physical uplink control channel time-frequency resource set includes time-frequency resources of a plurality of physical uplink control channels, in step 3, the UE may select the longest physical uplink control channel time-frequency resource from the second candidate physical uplink control channel time-frequency set as the time-frequency set of the third candidate physical uplink control channel. When the time-frequency resource set of the third candidate physical uplink control channel includes time-frequency resources of a plurality of physical uplink control channels, in step 4, the UE randomly may select a time-frequency resource of any one physical uplink control channel from the time-frequency resource set of the third candidate physical uplink control channel, and transmit the alternate physical uplink control channel from the time-frequency resource of the selected physical uplink control channel. When there is one time-frequency resource of the physical uplink control channel corresponding to the time-frequency set of the candidate physical uplink control channel, the UE may transmit the alternate physical uplink control channel through the time-frequency resource of the corresponding physical uplink control channel without additional selection.

The first physical uplink control channel may include time-sensitive information such as HARQ-ACK of the URLLC service. In addition, decoding of the physical uplink control channel may be performed after all physical uplink control channels are received. Therefore, through the examples described above, the UCI intended to be transmitted through the first physical uplink control channel can be transmitted and decoded as quickly as possible. In addition, as the physical uplink control channel is longer, the reliability of UCI transmission is higher. Therefore, the reliability of the transmission of the alternate physical uplink control channel can be increased through the examples described above.

The physical uplink control channel may include a plurality of types of UCI according to the type of UCI information, such as HARQ-ACK, CSI Part1, and CSI Part2. In this case, the UE may transmit only some UCI types among the UCIs that the UE intends to transmit through the physical uplink control channel through the alternate physical uplink control channel. In this case, the UE may select the UCI to be transmitted through the alternate physical uplink control channel based on the priority of the UCI type.

As described above, the UE may transmit one physical uplink control channel of two physical uplink control channels scheduled in the same symbol in a time-frequency resource in which the corresponding physical uplink control channel is scheduled, and transmit the other physical uplink control channel in the alternate physical time-frequency resource. In this case, the UE may select a physical uplink control channel to be transmitted in a time-frequency resource in which the corresponding physical uplink control channel is scheduled according to the priority between the physical uplink control channels. In this case, the UE may transmit an unselected physical uplink control channel in an alternate physical time-frequency resource.

In a specific embodiment, the UE may obtain a priority between physical uplink control channels from a base station. Specifically, when the DCI configures the transmission of the physical uplink control channel of the UE, the UE may obtain the priority between the physical uplink control channels through the DCI. A case where the DCI configures the transmission of the physical uplink control channel of the UE may be a case where the DCI configures the HARQ-ACK transmission of the UE. In addition, a case where the DCI configures the transmission of the physical uplink control channel of the UE may be a case where the DCI configures the aperiodic CSI transmission of the UE. The priority between the physical uplink control channels may be explicitly indicated through a separate field of DCI.

In another specific embodiment, the priority between physical uplink control channels may be implicitly indicated in the DCI field. Priority between physical uplink control channels may be determined according to a HARQ process number (HPN). The priority between the physical uplink control channels may be determined according to a time-domain allocation field. Specifically, HARQ-ACK of a physical downlink data channel scheduled in the time-domain allocation field may have a higher priority. The priority between the physical uplink control channels may be determined based on the MCS used for transmission of a target signaled by the UCI of the physical uplink control channel. Specifically, a priority between physical uplink control channels may be determined such that a physical uplink control channel including HARQ-ACK of a physical downlink data channel that is more reliably transmitted has a higher priority. In a specific embodiment, a priority between physical uplink control channels may be determined such that a physical uplink control channel including HARQ-ACK of a physical downlink data channel transmitted at a lower code rate has a higher priority. The priority between the physical uplink control channels may be determined based on the MCS used for transmission of a target signaled by the UCI of the physical uplink control channel. The priority between physical uplink control channels may be determined based on a physical uplink control channel resource indicator. Specifically, the priority between physical uplink control channels may be determined to have a higher priority as the value of the physical uplink control channel resource indicator indicating the physical uplink control channel is smaller. The priority between physical uplink control channels may be determined based on a physical uplink control channel resource indicator. Specifically, the priority between the physical uplink control channels may be determined to have a higher priority as the symbol scheduled with the physical uplink control channel is advanced. The priority between the physical uplink control channels may be determined according to a time sequence in which a physical downlink control channel indicating a physical uplink control channel or a DCI indicating a physical uplink control channel is transmitted. Specifically, the priority between the physical uplink control channels may be determined to have a higher priority as the time at which the physical downlink control channel indicating the physical uplink control channel or the DCI indicating the physical uplink control channel is transmitted is advanced. The priority between the physical uplink control channels may be determined according to the service characteristics of the physical downlink data channel scheduled by the physical downlink control channel indicating the time-frequency resource in which the physical uplink control channel is scheduled. Specifically, the physical uplink control channel scheduled by the physical downlink control channel for scheduling the physical downlink data channel of the URLLC service may have a higher priority than the physical uplink control channel scheduled by the physical downlink control channel scheduling the physical downlink data channel of the eMBB service. The UE may determine the service characteristics of the physical downlink data channel scheduled by the physical downlink control channel based on the RNTI value of the physical downlink control channel. In another specific embodiment, the UE may determine a service characteristic of a physical downlink data channel scheduled by the physical downlink control channel according to the value of the DCI field. The priority between the physical uplink control channels may be determined according to the type of UCI included in the physical uplink control channel. Specifically, a physical uplink control channel including HARQ-ACK may have a higher priority than a physical uplink control channel including CSI. The priority between the physical uplink control channels may be determined according to the K1 value indicating the transmission time interval between the HARQ-ACK included in the physical uplink control channel and the physical downlink data channel. Specifically, the priority between physical uplink control channels may be determined to have a higher priority as the K1 value is smaller. This is because as the interval between the physical downlink data channel and HARQ-ACK is smaller, fast processing may be further required.

In addition, the UE may transmit a physical uplink control channel having the same priority through one physical uplink control channel. In this case, the UE may determine a time-frequency resource in which the corresponding physical uplink control channel is transmitted according to the above-described embodiments.

In addition, the UE may transmit the corresponding physical uplink control channel through a shortened format instead of dropping the transmission of the lower priority physical uplink control channel. Specifically, the UE may transmit a physical uplink control channel having a relatively low priority through a shortened format in a time-frequency resource except for a time-frequency resource in which a physical uplink control channel having a relatively high priority is transmitted. In addition, when the UE creates a shortened-format physical uplink control channel, a UE may puncture a UCI of a symbol overlapping in a time domain with a physical uplink control channel having a relatively high priority. In another specific embodiment, the UE may rate-match a physical uplink control channel having a relatively low priority to a physical uplink control channel in a shortened format. Specifically, the UE may determine the time-frequency resource of the physical uplink control channel according to the code rate using only the time-frequency resource to be used for transmission. When the physical uplink control channel is Format 2 or Format 3, the number of PRBs, which are frequency resources occupied by the physical uplink control channel, may be determined according to the UCI of the physical uplink control channel and the configured code rate. The UE may determine the number of PRBs in the shortened format using resources that can be actually transmitted (resources of symbols other than the punctured symbol) and the configured code rate. When DMRS cannot be transmitted through the shortened-format physical uplink control channel, the UE may drop the corresponding physical uplink control channel transmission. A case where the DMRS cannot be transmitted through the short-format physical uplink control channel may include a case where the DMRS cannot be transmitted due to the length of the shortened-format physical uplink control channel.

The UE may transmit a grant-free (GF) physical uplink data channel or a grant based (GB) configured physical uplink data channel. In this case, the grant-free configured physical uplink data channel may be a physical uplink data channel scheduled through RRC configuration. The grant-free physical uplink data channel may be referred to as a configured grant physical uplink data channel. Also, the grant based configured physical uplink data channel may be a physical uplink data channel configured through DCI of the physical downlink control channel. When the time-frequency resource in which the grant-free configured physical uplink data channel is scheduled overlaps with the grant based configured physical uplink data channel, the UE may drop transmission of one of the two physical uplink data channels and transmit only the other one physical uplink data channel. In this case, the operation method of the UE will be described.

When there is data (e.g., UL-SCH) to be transmitted through the grant-free physical uplink data channel, the UE may drop the grant-based physical uplink data channel transmission and transmit the grant-free physical uplink data channel. This is because the grant-free physical uplink data channel may be more suitable for services requiring rapid transmission such as URLLC data. In a specific embodiment, when the transmission period of the grant-free physical uplink data channel is shorter than a specific period, and there is data (e.g., UL-SCH) to be transmitted through the grant-free physical uplink data channel, the UE may drop the grant-based physical uplink data channel transmission and transmit the grant-free physical uplink data channel. In a specific embodiment, when the transmission period of the grant-free physical uplink data channel is not shorter than a specific period, the UE may transmit the grant-based physical uplink data channel and drop the grant-free physical uplink data channel transmission. When the UE drops the grant-based physical uplink data channel transmission and transmits the grant-free physical uplink data channel, the UE may transmit UCI, which should be transmitted through the grant-based physical uplink data channel, through the grant-free physical uplink data channel. In this case, the UE may transmit all UCIs to be transmitted through the grant-based physical uplink data channel through the grant-free physical uplink data channel. In another specific embodiment, the UE may transmit some UCIs to be transmitted through the grant-based physical uplink data channel through the grant-free physical uplink data channel. For example, when the grant-based physical uplink data channel is included in the aperiodic CSI, the UE may transmit all or part of the aperiodic CSI through the grant-free physical uplink data channel. When the grant-based physical uplink data channel includes CSI part1 and CSI part2, the UE may transmit only CSI part1 among CSI part1 and CSI part2 through the grant-free physical uplink data channel. When the grant-based physical uplink data channel includes HARQ-ACK and aperiodic CSI, the UE may transmit all or part of HARQ-ACK and aperiodic CSI through the grant-free physical uplink data channel. In this case, the UE can transmit only the HARQ-ACK through the grant-free physical uplink data channel without transmitting the CSI. In another specific embodiment, the UE may transmit only HARQ-ACK and CSI part1 through the grant-free physical uplink data channel without transmitting CSI part2.

In another specific embodiment, when the time-frequency resource in which the grant-based physical uplink data channel is scheduled and the time-frequency resource in which the grant-free physical uplink data channel is scheduled overlap, the base station may signal which physical uplink data channel of the grant-based physical uplink data channel or the grant-free physical uplink data channel is transmitted. Specifically, the base station may signal which physical uplink data channel among the grant-based physical uplink data channel and the grant-free physical uplink data channel will be transmitted by the UE in the DCI scheduling grant-based physical uplink data channel. The UE may determine which physical uplink data channel to transmit among the grant-based physical uplink data channel and the grant-free physical uplink data channel based on DCI scheduling the grant-based physical uplink data channel. Specifically, the DCI may signal which physical uplink data channel will be transmitted by the UE among the grant-based physical uplink data channel and the grant-free physical uplink data channel. In a specific embodiment, the 1-bit field of the DCI may signal which physical uplink data channel will be transmitted by the UE among the grant-based physical uplink data channel and the grant-free physical uplink data channel.

In another specific embodiment, the DCI may implicitly signal which physical uplink data channel will be transmitted by the UE among the grant-based physical uplink data channel and the grant-free physical uplink data channel. For example, when the code rate of the MCS value of the physical downlink control channel (or DCI) scheduling the grant-based physical uplink data channel is smaller than a specific value, the UE may transmit the grant-based physical uplink data channel and drop the grant-free physical uplink data channel transmission. When the code rate of the MCS value of the physical downlink control channel (or DCI) scheduling the grant-based physical uplink data channel is greater than a specific value, the UE may drop the grant-based physical uplink data channel transmission and transmit the grant-free physical uplink data channel transmission. In this case, the specific value may be a predetermined value. Also, a specific value may be configured by an RRC signal. Also, the specific value may be a value configured when the grant-free physical uplink data channel is configured.

The UE may determine which physical uplink data channel to transmit among the grant-based physical uplink data channel and the grant-free physical uplink data channel based on the location of the symbol through which the grant-based physical uplink data channel is transmitted and the location of the symbol through which of the grant-free physical uplink data channels is transmitted. Specifically, when the transmission of the grant-based physical uplink data channel is terminated before the grant-free physical uplink data channel transmission, the UE may transmit the grant-based physical uplink data channel and drop the grant-free physical uplink data channel transmission. When the transmission of the grant-based physical uplink data channel does not end before the grant-free physical uplink data channel transmission, the UE may drop the grant-based physical uplink data channel transmission and transmit a grant-free physical uplink data channel.

The UE may determine which physical uplink data channel to transmit among the grant-based physical uplink data channel and the grant-free physical uplink data channel based on the K2 value of DCI scheduling the grant-based physical uplink data channel. In this case, the K2 value is a value indicating an interval between a physical downlink control channel and the grant-based physical uplink data channel. Specifically, when the K2 value is smaller than a specific value, the UE may transmit the grant-based physical uplink data channel and drop the grant-free physical uplink data channel transmission. Specifically, when the K2 value is equal to or greater than the specific value, the UE may drop the grant-based physical uplink data channel and transmit the grant-free physical uplink data channel transmission. The specific value may be a fixed value. For example, the specific value may be 0 or 1. In another specific embodiment, the specific value may be a value configured from the higher layer. In another specific embodiment, the specific value may be determined based on the period of the grant-free physical uplink data channel. For example, the specific value may be a period of a grant-free physical uplink data channel.

In the above-described embodiments, the physical data channel may include a PDSCH or a PUSCH. In addition, the physical control channel may include a PDCCH or a PUCCH. In addition, in the embodiment described using PUSCH, PDCCH, PUCCH, and PDCCH, other types of data channels and control channels may be applied.

The method and system of the present disclosure are described in relation to specific embodiments, configuration elements, a part of or the entirety of operations of the present disclosure may be implemented using a computer system having general purpose hardware architecture.

The aforementioned description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, these embodiments as described above are only proposed for illustrative purposes and do not limit the present disclosure. For example, each component described to be of a single type can be implemented in a distributed manner. Likewise, components described to be distributed can be implemented in a combined manner.

The scope of the present disclosure is presented by the accompanying Claims rather than the aforementioned description. It should be understood that all changes or modifications derived from the definitions and scopes of the Claims and their equivalents fall within the scope of the present disclosure.

The invention claimed is:

1. A user equipment (UE) configured to operate in a wireless communication system, the UE comprising:
   a communication module; and
   a processor configured to control the communication module,
   wherein the processor is configured to:
   receive scheduling information for a physical uplink shared channel (PUSCH);
   after a reception of the scheduling information, receive a group common physical downlink control channel (PDCCH) including an indicator at a monitoring time, the indicator indicating at least one resource part among a plurality of resource parts within a reference UL resource; and
   when the at least one resource part overlaps with a resource scheduled for the PUSCH, cancel a transmission of the PUSCH,
   wherein the reference UL resource is started in time after an offset from the monitoring time, and a value of the offset is determined based on a PUSCH processing time.

2. The UE of claim 1, wherein the reference UL resource is started at an earliest symbol after the offset from the monitoring time.

3. The UE of claim 1, wherein the reference UL resource excludes a downlink symbol configured by a downlink/uplink (DL/UL) assignment of a cell-specific radio resource control (RRC) signal.

4. The UE of claim 1, wherein the PUSCH processing time is associated with a minimum time required from a reception of a PDCCH scheduling the PUSCH to a generation of the PUSCH.

5. The UE of claim 1, wherein a plurality of bits in the indicator are one-to-one mapped to the plurality of resource parts, where each of one or more first resource parts includes P symbols and each of remaining second resource parts includes Q symbols,
   wherein P and Q are set so that a difference between P and Q is to be at most 1, and
   wherein P and Q are natural numbers.

6. The UE of claim 1, wherein when the reference UL resource includes S symbols, the reference UL resource includes N sets of symbols, where each of N-mod (S, N) sets includes floor (S/N) symbols and each of mod (S, N) sets includes ceil (S/N) symbols,
   wherein N is a natural number, mod ( ) represents a modulo function, ceil ( ) represents a ceiling function, and floor ( ) represents a flooring function, and wherein each of the N sets includes one or more resource parts in a frequency domain.

7. A base station (BS) configured to operate in a wireless communication system, the BS comprising:

a communication module; and a processor configured to control the communication module, wherein the processor is configured to:

transmit scheduling information for a physical uplink shared channel (PUSCH);

after a transmission of the scheduling information, transmit a group common physical downlink control channel (PDCCH) including an indicator at a monitoring time, wherein the indicator indicates at least one resource part among a plurality of resource parts within a reference UL resource; and when the at least one resource part overlaps with a resource scheduled for the PUSCH, skip a reception of the PUSCH, wherein the reference UL resource is started in time after an offset from the monitoring time, and a value of the offset is determined based on a PUSCH processing time.

8. The BS of claim 7, wherein the reference UL resource is started at an earliest symbol after the offset from the monitoring time.

9. The BS of claim 7, wherein the reference UL resource excludes a downlink symbol configured by a downlink/uplink (DL/UL) assignment of a cell-specific radio resource control (RRC) signal.

10. The BS of claim 7, wherein the PUSCH processing time is associated with a minimum time required for a user equipment from a reception of a PDCCH scheduling the PUSCH to a generation of the PUSCH.

11. The BS of claim 7, wherein a plurality of bits in the indicator are one-to-one mapped to the plurality of resource parts, where each of one or more first resource parts includes P symbols and each of remaining second resource parts includes Q symbols, wherein P and Q are set so that a difference between P and Q is to be at most 1, and wherein P and Q are natural numbers.

12. The BS of claim 7, wherein when the reference UL resource includes S symbols, the reference UL resource includes N sets of symbols, where each of N-mod (S, N) sets includes floor (S/N) symbols and each of mod (S, N) sets includes ceil (S/N) symbols, wherein N is a natural number, mod ( ) represents a modulo function, ceil ( ) represents a ceiling function, and floor ( ) represents a flooring function, and wherein each of the N sets includes one or more resource parts in a frequency domain.

13. A method performed by a user equipment (UE) in a wireless communication system, the method comprising:

receiving scheduling information for a physical uplink shared channel (PUSCH);

after a reception of the scheduling information, receiving a group common physical downlink control channel (PDCCH) including an indicator at a monitoring time, the indicator indicating at least one resource part among a plurality of resource parts within a reference UL resource; and when the at least one resource part overlaps with a resource scheduled for the PUSCH, canceling a transmission of the PUSCH, wherein the reference UL resource is started in time after an offset from the monitoring time, and a value of the offset is determined based on a PUSCH processing time.

14. The method of claim 13, wherein the reference UL resource is started at an earliest symbol after the offset from the monitoring time.

15. The method of claim 13, wherein the reference UL resource excludes a downlink symbol configured by a downlink/uplink (DL/UL) assignment of a cell-specific radio resource control (RRC) signal.

16. The method of claim 13, wherein the PUSCH processing time is associated with a minimum time required from a reception of a PDCCH scheduling the PUSCH to a generation of the PUSCH.

17. The method of claim 13, wherein a plurality of bits in the indicator are one-to-one mapped to the plurality of resource parts, where each of one or more first resource parts includes P symbols and each of remaining second resource parts includes Q symbols, wherein P and Q are set so that a difference between P and Q is to be at most 1, and wherein P and Q are natural numbers.

18. The method of claim 13, wherein when the reference UL resource includes S symbols, the reference UL resource includes N sets of symbols, where each of N-mod (S, N) sets includes floor (S/N) symbols and each of mod (S, N) sets includes ceil (S/N) symbols, wherein N is a natural number, mod ( ) represents a modulo function, ceil ( ) represents a ceiling function, and floor ( ) represents a flooring function, and wherein each of the N sets includes one or more resource parts in a frequency domain.

19. A method performed by a base station (BS) in a wireless communication system, the method comprising:

transmitting scheduling information for a physical uplink shared channel (PUSCH);

after a transmission of the scheduling information, transmitting a group common physical downlink control channel (PDCCH) including an indicator at a monitoring time, wherein the indicator indicates at least one resource part among a plurality of resource parts within a reference UL resource; and when the at least one resource part overlaps with a resource scheduled for the PUSCH, skip a reception of the PUSCH, wherein the reference UL resource is started in time after an offset from the monitoring time, and a value of the offset is determined based on a PUSCH processing time.

20. The method of claim 19, wherein the reference UL resource is started at an earliest symbol after the offset from the monitoring time.

21. The method of claim 19, wherein the reference UL resource excludes a downlink symbol configured by a downlink/uplink (DL/UL) assignment of a cell-specific radio resource control (RRC) signal.

22. The method of claim 19, wherein the PUSCH processing time is associated with a minimum time required for a user equipment from a reception of a PDCCH scheduling the PUSCH to a generation of the PUSCH.

23. The method of claim 19, wherein a plurality of bits in the indicator are one-to-one mapped to the plurality of resource parts, where each of one or more first resource parts includes P symbols and each of remaining second resource parts includes Q symbols, wherein P and Q are set so that a difference between P and Q is to be at most 1, and wherein P and Q are natural numbers.

24. The method of claim 19, wherein when the reference UL resource includes S symbols, the reference UL resource includes N sets of symbols, where each of N-mod (S, N) sets includes floor (S/N) symbols and each of mod (S, N) sets includes ceil (S/N) symbols, wherein N is a natural number, mod ( ) represents a modulo function, ceil ( ) represents a ceiling function, and floor ( ) represents a flooring function, and wherein each of the N sets includes one or more resource parts in a frequency domain.

\* \* \* \* \*